US007313513B2

(12) United States Patent
Kinder

(10) Patent No.: US 7,313,513 B2
(45) Date of Patent: Dec. 25, 2007

(54) METHOD FOR EDITING AND ENHANCING READABILITY OF AUTHORED DOCUMENTS

(75) Inventor: Gary Kinder, Seattle, WA (US)

(73) Assignee: WordRake LLC, Atlanta, GA (US)

( * ) Notice: Subject to any disclaimer, the term of this patent is extended or adjusted under 35 U.S.C. 154(b) by 910 days.

(21) Appl. No.: 10/438,083

(22) Filed: May 13, 2003

(65) Prior Publication Data

US 2003/0212541 A1 Nov. 13, 2003

(51) Int. Cl.
G06F 17/27 (2006.01)
G06F 17/20 (2006.01)
G09B 17/00 (2006.01)

(52) U.S. Cl. ............................... 704/1; 704/9; 434/178
(58) Field of Classification Search ...................... None
See application file for complete search history.

(56) References Cited

U.S. PATENT DOCUMENTS

| 6,012,075 | A | * | 1/2000 | Fein et al. | .................. | 715/540 |
| 6,658,377 | B1 | * | 12/2003 | Anward et al. | ................ | 704/9 |
| 2002/0194230 | A1 | * | 12/2002 | Polanyi et al. | .............. | 707/540 |
| 2003/0068603 | A1 | * | 4/2003 | Cupp | ......................... | 434/178 |

OTHER PUBLICATIONS

Kudo, I. Koshino, H. Chung, M. Morimoto, T. "Schema method: A framework for correcting grammatically ill-formed input" International Conference on Computational Linguistics pp. 341-347 1988.*

*The Elements of Style*, by William Strunk, Jr. and E.B. White, with Revisions, an Introduction, and a New Chapter in Writing by E.B. White, The Macmillan Company 1959, pp. 12-19, and 64-65.
*Style: Toward Clarity and Grace*, by Joseph M. Williams, with two chapters coauthored by Gregory G. Colomb, The University of Chicago Press, 1990, pp. 30-41, 70-73, 114-133.
*Edit Yourself: A manual for everyone who works with words*, by Bruce Ross-Larson, W.W. Norton and Company, 1982, pp. 3-7, 26-31, 42-43, 50-51, 70-77, 84-85, 98-99.
*Plain English for Lawyers*, Second Edition, by Richard Wydick, California Academic Press, 1985, pp. 6-17, 23-25, 27-31, 36-39, 64-67, 70-71.
Statement of Gary Kinder, with workbook pages dated 2001.
*Workbook of Seminar by Gary Kinder "Advanced Writing and Editing for Partners Only"* presented to the partners of McDermott, Will & Emery, Jan. 1998.

* cited by examiner

*Primary Examiner*—David Hudspeth
*Assistant Examiner*—Matthew J Sked
(74) *Attorney, Agent, or Firm*—Knobbe, Martens, Olson & Bear, LLP

(57) ABSTRACT

Various methods are disclosed for improving the readability of authored documents. The methods generally involve scanning a sentence to check for specific signs of potential writing problems, and applying associated sign-dependent decision logic to assess whether particular writing problems exist. The methods may be implemented in a computer program that makes editing suggestions to a user and/or makes edits automatically. The program may, in some cases, dim unnecessary language to reveal how the sentence will read with such language removed.

47 Claims, 33 Drawing Sheets

TYPICALLY UNNECESSARY PHRASES AND WEAK CONSTRUCTIONS BEGINNING WITH "IT"

70

It is said that
It was said that
It may be said that
It must be said that
It might be said that
It should be said that
It could be said that
It will be said that
It has been said that
It bears saying that
It bore saying that
It is stated that
It was stated that
It may be stated that
It must be stated that
It might be stated that
It should be stated that
It could be stated that
It will be stated that
It has been stated that
It bears stating that
It bore stating that
It is noted that
It was noted that
It may be noted that
It must be noted that
It might be noted that
It should be noted that
It could be noted that
It will be noted that
It has been noted that
It bears noting that
It bore noting that
It is no secret that
It was no secret that
It may be no secret that
It might be no secret that
It must be no secret that
It should be no secret that
It could be no secret that
It will be no secret that It is argued that
It was argued that
It may be argued that
It must be argued that
It might be argued that
It should be argued that
It could be argued that
It will be argued that
It has been argued that
It is remembered that
It was remembered that
It may be remembered that
It must be remembered that
It might be remembered that
It should be remembered that
It could be rememberd that
It will be remembered that
It bears remembering that
It bore remembering that
It is appreciated that
It was appreciated that
It may be appreciated that
It must be appreciated that
It might be appreciated that
It should be appreciated that
It could be appreciated that
It will be appreciated that
It is likely that
It was likely that
It is most likely that
It is more likely that
It was most likely that
It was more likely that
It is recognized that
It was recognized that
It may be recognized that
It must be recognized that
It might be recognized that
It should be recognized that
It could be recognized that
It will be recognized that

FIG. 2

TYPICALLY WEAK CONSTRUCTIONS BEGINNING WITH "THERE"

124 →

There are _____ that
There were _____ that
There is _____ that
There was _____ that
There have been _____ that
There are _____ who
There were _____ who
There is _____ who
There was _____ who
There have been _____ who
There are _____ where
There were _____ where
There is _____ where
There was _____ where
There have been _____ where

FIG. 4

TYPICALLY UNNECESSARY PHRASES BEGINNING WITH "IN"

| | |
|---|---|
| in a row | in essence |
| in addition | in color |
| in duration | in detail |
| in effect | in fact |
| in point of fact | in length |
| in particular | in short |
| in size | in time |
| in turn | in advance |
| in which | in the event |
| in no event | in the matter |
| in connection with | in excess of |
| in this case | in this cause |
| in this action | in this instance |
| in this matter | in the present case |
| in the context of | in the course of |
| in the amount of | in the employ of |
| in the process of | in accord |
| in accordance with | in the form of |
| in advance of | in and of itself |
| in the direction of | in compliance with |
| in its capacity | in its entirety |
| in its subject matter | in light of |
| in addition to | in pertinent part |
| in such a proceeding | in relevant part |
| in significant part | in any case |
| in the first instance | in the first place |
| in its brief | in response to |
| in an effort to | in an attempt to |
| in considering | in terms of |
| in such a way | in attendance |
| in his mind | in their minds |
| in her mind | in your mind |
| in the same manner | in the way of |
| in the situation where | in the alternative |
| in a situation where | |

**TYPICALLY UNNECESSARY PHRASES
AND WEAK CONSTRUCTIONS
CONTAINING "AS"**

194 → as to
as set forth
as well as
as a matter of course
as a general matter
as needed
as is
as it would be impractical
as far as possible
as a _____
as possible as with
as written
as a whole
as a result of
as necessary
as such
as concerns
as much as possible
as _____
regarded as
as _____ as possible

FIG. 9a

**TYPICALLY UNNECESSARY PHRASES
AND WEAK CONSTRUCTIONS
CONTAINING "OR"**

195 → or also
or less or not

COMMON PREPOSITIONS

| | | | |
|---|---|---|---|
| about | behind | inside | throughout |
| above | below | into | to (not an infinitive) |
| across | beneath | near | toward |
| after | beside | off | under |
| against | between | on | up |
| among | by | onto | upon |
| around | down | out of | with |
| at | for | over | within |
| before | from | through | without |

FIG. 14

TYPICALLY UNNECESSARY WORDS

| | |
|---|---|
| actually | aforementioned |
| aforesaid | and further |
| any | apparently |
| applicable | basic |
| basically | currently |
| directly | effective |
| effectively | essentially |
| evidently | given |
| herein | at all |
| hereinafter | heretofore |
| herewith | incurred |
| individual | just |
| merely | outright |
| personally | primarily |
| purposes | consequently |
| respective | set forth |
| simple | simply |
| sometime | specific |
| specifically | no doubt |
| thereby | therein |
| thereof | herewith |
| upcoming | clearly |
| express | expressly |
| necessary | totally |
| yet | quite |
| respective | duly |
| squarely | particular |
| very | really |
| else | |

274 → effectively

FIG. 15

CLICHÉS

275 →

- the bottom line
- catch-22 situation
- out of the blue
- avoid like the plague
- shoot from the hip
- let the chips fall where they may
- walk a mile in his shoes
- water under the bridge
- beating my head against the wall
- the whole nine yards
- between a rock and a hard place
- grab the bull by the horns
- tip of the iceberg
- back to the drawing board
- hit the nail on the head
- cut off the nose to spite the face
- put the cart before the horse

- open Pandora's box
- the best of all worlds
- state of the art
- few and far between
- fly by the seat of the pants
- pick your brain
- barking up the wrong tree
- below the belt
- beating a dead horse
- a no-win situation
- high and dry
- get off his back
- the whole ball of wax
- a disaster area
- the forest for the trees
- a big deal
- let the cat out of the bag

REDUNDANCIES

276 →

- brief overview
- patently obvious
- short synopsis
- excess verbiage
- binding contract

- mandatory requirement
- sworn testimony
- true facts
- several different
- actively engaged

FIG. 16

PHRASES THAT TYPICALLY SHOULD BE SHORTER

277 →
- is indebted to
- to the extent possible
- incur the cost
- question at issue
- appears to have no relevance
- reason why
- briefly stated
- generally speaking

- desires to obtain
- purports to rely
- with certain knowledge
- with respect to
- decline to accept
- the fact that
- at the time

WORD PAIRS IN WHICH THE FIRST WORD TYPICALLY IS UNNECESSARY

278 →
- found in
- provided under
- authored by
- displayed on
- imposed under
- listed below
- sent to
- appearing in
- located by
- contained within

- provided in
- provided below
- located at
- found within
- contained in
- included in
- taken from
- appearing within
- located in
- brought by

FIG. 17

VERBS ENDING IN "ION"

347 →
envision
function
position question
mention

NOUNS ENDING IN "ION" THAT DO NOT HAVE VERB FORMS

348 →
ammunition
foundation
lotion
notion
section
excursion
privation commotion
locomotion
nation
potion
vision
premonition

PHRASES CONTAINING NOMINALIZATIONS THAT DO NOT END IN "ION"

349 →
offers evidence
make reference to
is an attempt to
is an exercise of
have knowledge of is in receipt of
conduct an analysis of
engage in harassment
give a review of

FIG. 19

PHRASES CONTAINING NOMINALIZATIONS THAT END IN "ION"

350 provide an explanation
provided an explanation
give an explanation
gave an explanation
provide the explanation
provided the explanation
give the explanation
gave the explanation
permit the inclusion
permitted the inclusion
allow the inclusion
allowed the inclusion
permit an exclusion
permitted an exclusion
give an exclusion
gave an exclusion
allow an exclusion
allowed an exclusion
permit the exclusion
permitted the exclusion
give the exclusion
gave the exclusion
allow the exclusion
allowed the exclusion
make a motion
made a motion
make the motion
made the motion
raise an exception
raised an exception
raise the exception
raised the exception
give an exception
gave an exception
engage in the production
engaged in the production
make a presentation
made a presentation
give a presentation
gave a presentation
make a verification
made a verification arrive at a decision
arrived at a decision
give a decision
gave a decision
make a decision
made a decision
offer a decision
offered a decision
make a recommendation
made a recommendation
offer a recommendation
offered a recommendation
give a recommendation
gave a recommendation
engage in intimidation
engaged in intimidation
is in violation
was in violation
give an indication
gave an indication
offer an indication
offered an indication
come to the realization
came to the realization
arrive at the realization
arrived at the realization
make corrections
made corrections
make a determination
made a determination
perform an examination
performed an examination
make an exclamation
made an exclamation
make a prediction
made a prediction
make preparations
made preparations
engage in prevarication
engaged in prevarication
make a confession
made a confession

FIG. 20

WEAK CONSTRUCTIONS CONTAINING A "TO BE" VERB, AN ARTICLE OR "ONE," AND "WHO," "WHERE," "ONE," OR "THAT"

351

| | | | | | |
|---|---|---|---|---|---|
| _____ | is a _____ | that | _____ | to be _____ | where |
| _____ | is a _____ | who | _____ | to be _____ | one |
| _____ | is a _____ | where | _____ | been a _____ | that |
| _____ | is a _____ | one | _____ | been a _____ | who |
| _____ | was a _____ | that | _____ | been a _____ | where |
| _____ | was a _____ | who | _____ | been a _____ | one |
| _____ | was a _____ | where | _____ | been _____ | that |
| _____ | was a _____ | one | _____ | been _____ | who |
| _____ | am a _____ | that | _____ | been _____ | where |
| _____ | am a _____ | who | _____ | been _____ | one |
| _____ | am a _____ | one | _____ | is one that _____ | |
| _____ | were a _____ | that | _____ | is one who _____ | |
| _____ | were a _____ | who | _____ | was one that _____ | |
| _____ | are a _____ | that | _____ | was one who _____ | |
| _____ | are a _____ | who | _____ | am one who _____ | |
| _____ | are _____ | where | _____ | am one that _____ | |
| _____ | to be a _____ | that | _____ | are one that _____ | |
| _____ | to be a _____ | who | _____ | are one who _____ | |
| _____ | to be a _____ | where | _____ | are ones that _____ | |
| _____ | to be a _____ | one | _____ | are ones who _____ | |
| _____ | to be _____ | that | _____ | were ones that _____ | |
| _____ | to be _____ | who | _____ | were ones who _____ | |

The EDIT Card

Place the card on top of the page, then slowly slide it downward, one line at a time, matching the signs on the card with the words in your sentences. Wherever you see a match, often you can improve the sentence.

The Signs
it – useless words at the opening of a sentence or clause – *It should be noted that* ....
in – many unnecessary phrases – *in fact*; *in an effort* to
of – unnecessary words left or right – the time *of day*; *the purpose of* this report
. – check the end of each sentence for "over explaining" (often a prepositional phrase) – His arm was being crushed *to a pulp(.)*
to be verbs (am, is, was, were, are, been) – often signal passive voice – look immediately to the right for a "strong verb" and back to the left for the "object"; if both are there, then reverse the order of the sentence – The ball was hit by me.; I hit the ball.
ion (plus of and to be) – one, two, or all three of these signs spot nominalizations, nouns that should be verbs – The new procedure is a circumvention of established rules.; The new procedure circumvents established rules.
as, or, any, that – more signs pointing to unnecessary words and phrases
prepositions – more "over explaining," but in the middle of a sentence
purple words – almost always should come out

FIG. 30

METHOD FOR EDITING AND ENHANCING READABILITY OF AUTHORED DOCUMENTS

FIELD OF THE INVENTION

This invention relates generally to writing composition and, more specifically, to aids for composing concise English.

BACKGROUND OF THE INVENTION

A writer looks at a sentence. The sentence is grammatical, but wordy, dull, and difficult to understand. The writer wants to make the sentence succinct, lively, and easier to read. Where does the writer begin?

The problems facing the writer arise from infinite combinations of unnecessary words, passive voice, weak verbs, and convoluted construction. For years, writing texts and teachers have addressed these problems using technical terms—participle, idiom, subjunctive, relative pronoun—or generally advised writers to add vigor to their sentences by writing in the active voice. Nothing offers the writer an editing method that is quick, precise, repeatable, and productive.

The most revered of all writing texts is Strunk and White's classic, *The Elements of Style*. The heart of this book is Rule 13, "Omit needless words," and the often quoted lines:

"Vigorous writing is concise. A sentence should contain no unnecessary words, a paragraph no unnecessary sentences, for the same reason that a drawing should have no unnecessary lines and a machine no unnecessary parts." (p. 17)

Strunk and White add, "[m]any expressions in common use violate this principle:" They list seven examples:

"the question as to whether
there is no doubt but that
used for fuel purposes
he is a man who
in a hasty manner
this is a subject that
his story is a strange one"

Strunk and White intended the list to exemplify common ways writers express themselves using too many words. Millions more exist, and a writer cannot memorize them all.

The most widely read and acclaimed book on writing for lawyers is Richard Wydick's *Plain English for Lawyers*. Wydick titles Chapter Two, "Omit Surplus Words." Two sections form the core of the chapter: "Avoid Compound Constructions" and "Avoid Word-Wasting Idioms." Wydick's list of "Compound Constructions" is: (p. 11)

"at that point in time
by means of
by reason of
by virtue of
for the purpose of
for the reason that
in accordance with
inasmuch as
in connection with
in favor of
in order to
in relation to
in the nature of
prior to
subsequent to
with a view to
with reference to"

In his section "Avoid Word-Wasting Idioms," Wydick writes, "Likewise, words like case, instance, and situation spawn verbosity:

in some instances the parties can
in many cases you will find
that was a situation in which the court
RICO claims are now more frequent than was formerly the case
injunctive relief is required in the situation in which
in the majority of instances the grantor"

But how does even a competent writer or editor distinguish between "idioms" and "compound constructions" and keep track of the thousands of each that can arise?

A writer makes a wordy sentence even more dull and difficult to read by using passive voice and nominalizations (nouns that should be verbs). The frequent use of passive voice is the most infamous of all writing problems. Teachers and texts constantly remind writers to avoid it, yet few writers know how to recognize it, how to make it active, or when it is necessary.

Strunk and White have little to say about passive voice: "The active voice is usually more direct and vigorous than the passive." And, "This rule does not, of course, mean that the writer should entirely discard the passive voice, which is frequently convenient and sometimes necessary." And, "The habitual use of the active voice, however, makes for forcible writing." (p. 13). They give examples but do not say how to recognize it or when it is necessary. They even confuse the reader by talking about "transitive verbs in the active voice," which has little to do with the passive voice problem.

When Wydick discusses passive voice (pp. 27-9), he offers only vague clues on how to recognize it, nothing direct, specific, and repeatable; then, like Strunk and White, he tells the writer to prefer the active voice; and last, unlike Strunk and White, he gives four situations in which the passive voice may be proper. But the writer still has no method for recognizing it and no guidance for making it active.

Another writing text that addresses passive voice is *The Careful Writer: A Modern Guide to English Usage*, by then Assistant Managing Editor of *The New York Times*, Theodore M. Bernstein, (1965, Atheneum). Similar to the explanations found in many writing and grammar texts, Bernstein describes passive voice like this: "When the subject of the verb is the agent performing an action, and the object is that which is acted upon, the verb is in the active voice. When the subject of the verb is the recipient of the action, the verb is in the passive voice." (p. 13). Abstract explanations like this make the passive voice problem sound mysterious and unsolvable. Bernstein mentions nothing about how to recognize quickly what might be a passive verb.

Nominalizations cause as much slowing and dulling as passive voice, but few people have even heard the word, let alone know how to recognize one. Like passive voice, a few nominalizations are necessary, but usually a writer should convert them to their verb form. Strunk and White do not discuss nominalizations. Neither does Bernstein. Wydick warns against using them and suggests: "You can spot most of the common nominalizations by their endings:

| al | ment | ant |
| ence | ion | ent |
| ancy | ency | ance |
| ity" | | |

To help them spot nominalizations, then, the writer and editor must memorize and search for all ten of these suffixes.

Despite hundreds of writing texts that have tried to explain what makes a sentence wordy or dull, despite all of the lists of useless words, intelligent people still write like this:

A high school senior in Honors English with a 3.9 GPA:
It was during this time that many citizens, particularly students, came to the realization that Sun Yat-sen's three principles of the people had not yet been accomplished through the bloody hardships of war.

A lawyer:
It should be noted that an oral notice of intent to renew, where a written notice is required under the terms of the lease, is sufficient to constitute an effective exercise of the option.

The editors of the Harvard *Management Communication Letter* in an article on writing:
The writer wants to ask a question about whether or not investors will learn from the crash in prices.

And the Dean of Admissions at Stanford University:
Although it has been argued that emphasizing the Achievement Tests in admissions, rather than SATs, would improve the quality of American secondary school education and consequently better prepare students for college, it is also true that requiring such tests could unfairly penalize disadvantaged students in the college admissions process.

All of these are grammatical, intelligent sentences, but they are not nearly as clear and taut as the writers could have produced (even though the last two were also professionally edited for publication); and each example comes from among myriad sentences with similar problems.

The problem of wordy, dull sentences pervades even the most august of our literary references. Few people would quibble that *Fowler's Modern English Usage*, *The Chicago Manual of Style*, and *The Oxford English Dictionary* are at the pinnacle of reference works relied upon by writers and editors. Yet:

*Fowler's* explains "reduplicated words" like this:
Most of us find an engaging quality in these words. Perhaps that is because it is through them that we enter the world of speech . . .

*The Chicago Manual of Style* contains this sentence, elaborating on Americans preferring to place punctuation inside the quotation mark:
In defense of nearly a century and a half of the American style, however, it may be said that it seems to have been working fairly well and has not resulted in serious miscommunication.

And the editors of *The Oxford English Dictionary* define "redundancy" as:
The incorporation of extra parts in the design of a mechanical or electronic system in such a way that its function is not impaired in the event of a failure.

Programmers have designed software to help writers spot problems electronically. By far the most popular editing software is Microsoft Word, which gives the writer "Readability Statistics." This tells the writer how many paragraphs, sentences, words, and characters are in the selection, plus the average number of characters per word, words per sentence, and sentences per paragraph. It can signal "long sentence" or "wordiness" or "contraction use." It tells the percentage of passive sentences (which sometimes is inaccurate). And it assigns the passage a "Readability Grade Level" according to something called the "Flesch-Kincaid" test. But the real problem with readability has little to do with how many words are in a sentence or how many syllables are in a word.

Apply Microsoft Word's® grammar checker to this sentence . . .
There's really no choice in the matter.
. . . and it tells the writer that the sentence is written at a fourth grade level, then suggests that the writer remove the contraction:
There's really no choice in the matter.
There is really no choice in the matter.

According to Word®, the writer cannot improve the sentence beyond this. If the intelligent writers above apply Microsoft Word's® grammar checker to their sentences, the program offers the following advice:

The high school senior:
It was during this time that many citizens, particularly students, came to the realization that Sun Yat-sen's three principles of the people had not yet been accomplished through the bloody hardships of war.
Word® notes that "Yat-sen's" is "Not in the dictionary." It also tells the writer that the sentence is passive (it doesn't say where) and written at a $12^{th}$ Grade level. Word® says nothing else about the sentence.

The lawyer:
It should be noted that an oral notice of intent to renew, where a written notice is required under the terms of the lease, is sufficient to constitute an effective exercise of the option.
Word® labels this sentence passive. It doesn't say the sentence contains two passive verbs, or where it's passive, or that the lawyer can correct anything else.

The Harvard editors:
The writer wants to ask a question about whether or not investors will learn from the crash in prices.
Word® has nothing to say about this example, except that it is written at a seventh grade level.

The Stanford Dean of Admissions:
Although it has been argued that emphasizing the Achievement Tests in admissions, rather than SATs, would improve the quality of American secondary school education and consequently better prepare students for college, it is also true that requiring such tests could unfairly penalize disadvantaged students in the college admissions process.
Here, Word® claims that the sentence is not passive (it is), rates the sentence at a $12^{th}$ grade reading level, and indicates nothing else wrong.

If the editors of the three reference works above use the Word® grammar checker to comb their entries:

The editors at *Fowler's* will learn that Word® finds nothing wrong with their sentence:
Most of us find an engaging quality in these words. Perhaps that is because it is through them that we enter the world of speech . . .

The editors at *The Chicago Manual of Style* will see Word® label the problem with their sentence as "wordiness" and suggest that they remove "fairly." Without saying where or how to change it, Word® will also note that the sentence is passive, which it is, but another problem overrides that point. According to Word®, they cannot improve the rest of the sentence.

> In defense of nearly a century and a half of the American style, however, it may be said that it seems to have been working fairly well and has not resulted in serious miscommunication.
>
> In defense of nearly a century and a half of the American style, however, it may be said that it seems to have been working well and has not resulted in serious miscommunication.

The editors at *The Oxford English Dictionary* will discover that Word® highlights "not impaired," then diagnoses the problem as "wordiness," and offers "no suggestions." Word® also will highlight "the event" and suggest that the editors replace those words with "case." That's the end of Word's® assessment.

> The incorporation of extra parts in the design of a mechanical or electronic system in such a way that its function is not impaired in the event of a failure.
>
> The incorporation of extra parts in the design of a mechanical or electronic system in such a way that its function is not impaired in case of a failure.

Imagine a law firm partner who expects to spend one to two hours reviewing and editing an associate's brief, but instead has to spend five or six hours, and cannot bill for that extra time; a corporate officer who receives several five-page reports from mid-level managers, when each manager could convey the same information in three or four pages; a copy editor who has to tighten a 500-page manuscript on deadline. Imagine a patent examiner who has to wade through thousands of unnecessary words to find the meaning the writer intends to convey. Then imagine that these writers had a method that helped them edit, so they could retain their individual voices, but convey the same meaning faster and in far fewer words.

That is the essence of good writing: Words that do not convey meaning to a reader not only are useless, they also get in the way of the words that are trying to convey meaning. They must come out.

If a writer could consistently delete even three words from a 12-15 word sentence, then 10 pages of words drops to fewer than eight pages, yet the writer still conveys the same meaning to the reader. For instance:

> The high school senior could have written:
> During this time many citizens, particularly students, realized that the bloody hardships of war had not accomplished Sun Yat-sen's three principles of the people.

instead of:

> It was during this time that many citizens, particularly students, came to the realization that Sun Yat-sen's three principles of the people had not yet been accomplished through the bloody hardships of war.

The lawyer could have expressed a complicated thought more clearly, like this:

> [Even] where the lease requires written notice, an oral notice of intent to renew exercises the option.

instead of like this:

> It should be noted that an oral notice of intent to renew, where a written notice is required under the terms of the lease, is sufficient to constitute an effective exercise of the option.

The Harvard editors could have trimmed a little more:
> The writer wants to question whether investors will learn from the crash. from what they started with:

> The writer wants to ask a question about whether or not investors will learn from the crash in prices.

And the dean needed far fewer words to say what she meant:

> Emphasizing the Achievement Tests, rather than SATs, might improve American secondary school education and better prepare students for college; but requiring such tests could unfairly penalize disadvantaged students.

rather than what she wrote:

> Although it has been argued that emphasizing the Achievement Tests in admissions, rather than SATs, would improve the quality of American secondary school education and consequently better prepare students for college, it is also true that requiring such tests could unfairly penalize disadvantaged students in the college admissions process.

Even our most popular reference texts on words and writing would improve by ridding sentences of unnecessary words and bringing them to life.

The sentences from *Fowler's* could have appeared like this:

> Most of us find an engaging quality in these words. Perhaps that is because through them we enter the world of speech . . .

instead of like this:

> Most of us find an engaging quality in these words. Perhaps that is because it is through them that we enter the world of speech . . .

In the Chicago style manual, we could have read the following sentence quickly and gone on to the next:

> For nearly a century and a half, however, the American style seems to have worked fairly well.

rather than having to read:

> In defense of nearly a century and a half of the American style, however, it may be said that it seems to have been working fairly well and has not resulted in serious miscommunication.

And in *The Oxford English Dictionary* we could have learned that a "redundancy" is:

> Incorporating extra parts in a mechanical or electronic system so that if one part fails, the system will continue to function.

yet the version we had to read defined it as:

> The incorporation of extra parts in the design of a mechanical or electronic system in such a way that its function is not impaired in the event of a failure.

A reader has to read every word the writer writes. The more useless words a reader has to sort through, the longer the reader takes to arrive at the writer's meaning. Because all writers intend to communicate, they would delete these useless words, enliven their sentences, and rearrange the sentences for greater clarity, if they knew how to detect and solve the problems. Nothing currently in text, electronic, or any other format reveals or addresses this, yet all writers and editors need this capability to refine their sentences.

There is, therefore, an unmet need in the art for a system and method for writing concise English which systematically identifies and removes useless words.

SUMMARY OF THE INVENTION

The invention provides the writer with a defined set of 12 signs and their meaning, plus lists of typically unnecessary words and phrases, many of which contain the signs. The signs appear in all writing, that of students, professors, lawyers, professional writers, CPAs, high school principals, CEOs, secretaries, managers, and those who create insurance policies. They appear in patent applications. The invention's unique premise is that each sign indicates a high mathematical probability that an editing problem exists. Like the doctor, the writer spends time efficiently by examining the words around the signs. Once the writer addresses the signs, the writer frequently finds other problems that have no signs, but that the writer might never have noticed without the editing dynamic set in motion by the signs.

The invention does not tell the writer what to do; it suggests that to begin the editing process, the writer look first for these signs, for they indicate most of the editing problems. By going directly to the signs and examining the words around them, a writer or editor can quickly spot and correct a majority of these problems, leaving readers with sentences that are easier to read and understand. To use the invention, writers do not have to sacrifice style or write like other writers; the signs help them refine and enhance their individual voices Writers do not need to memorize thousands of what Strunk and White call "expressions in common use" that violate their principle, "Omit Needless Words." Using the invention, a writer can quickly spot all seven of the examples they list and a majority of the others every time:
  "the question as to whether
  there is no doubt but that
  used for fuel purposes
  he is a man who
  in a hasty manner
  this is a subject that
  his story is a strange one"

Writers do not need to know the difference between Wydick's "Idioms" and his "Compound Constructions"; the invention will direct the writer to 15 of Wydick's 17 "Compound Constructions":
  "at that point in time
  by means of
  by reason of
  by virtue of
  for the purpose of
  for the reason that
  in accordance with
  inasmuch as
  in connection with
  in favor of
  in order to
  in relation to
  in the nature of
  prior to
  subsequent to
  with a view to
  with reference to"
and all six of his "Word-Wasting Idioms":
  in some instances the parties can
  in many cases you will find
  that was a situation in which the court
  RICO claims are now more frequent than was formerly the case
  injunctive relief is required in the situation in which
  in the majority of instances the grantor Using the invention, the high school senior could delete nine of her original 33 words, or over 25%; the lawyer could cut his sentence in half; the Harvard editors could trim 19 words to 12; and the Stanford dean could reduce 49 words to 28 words. They all would still say the same thing, but their readers would have less work to do and could grasp more information faster. The invention enables writers and editors to do this.

The invention provides a system and method for writing concise English.

BRIEF DESCRIPTION OF THE DRAWINGS

The preferred and alternative embodiments of the present invention are described in detail below with further reference to the following drawings.

FIG. 2 illustrates a list of weak formulations including the word "it."

FIG. 4 illustrates a list of weak formulations including the word "there."

FIG. 6 illustrates a list of typically unnecessary phrases beginning with "in."

FIG. 9a illustrates typically unnecessary phrases and weak constructions containing "as."

FIG. 9b illustrates typically unnecessary phrases and weak constructions containing "or."

FIG. 14 is a list of prepositions that may be used in the method of FIG. 13.

FIG. 15 lists typically unnecessary words.

FIG. 16 lists clichés and redundancies.

FIG. 17 lists phrases that should typically be shorter, and word pairs in which the first word is typically unnecessary.

FIG. 19 lists verbs ending in "ion," nouns ending in "ion" that do not have verb forms, and phrases containing nominalizations that do not end in "ion."

FIG. 20 lists phrases containing nominalizations ending in "ion."

FIG. 21 lists weak constructions containing "to be" verbs.

FIGS. 28-30 illustrate embodiments of an editing card for assisting readers in manually reviewing and editing sentences.

FIGS. 32-25 depict screen shots showing how the computer-based embodiment may illustrate sentence editing steps to a user.

DETAILED DESCRIPTION OF THE INVENTION

Figure 1:
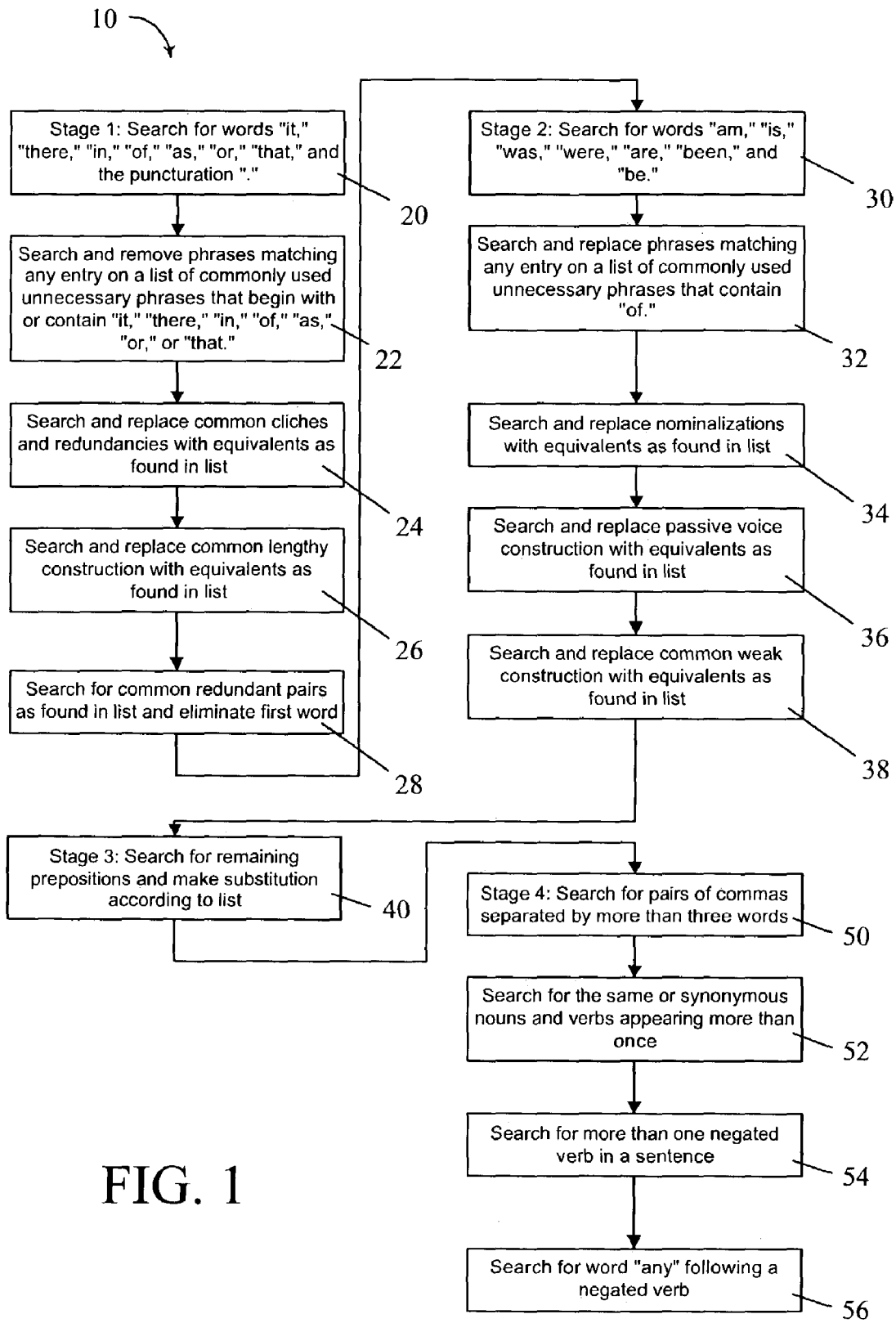
FIG. 1 illustrates a four-stage process for assessing and improving document readability according to a particular embodiment.

Referring to FIG. 1, a method 10 for identifying and removing needless words from written English is presented. By way of overview, the method comprises four stages. Each stage, in its turn, serves to remove common impediments to lively communication. Before examining the method in depth, a summarizing overview is set out.

While the method will work on single sentences, it is not limited to single sentences. Because the sentences forming a paragraph are related, the paragraph may, in some applications, be the optimum unit of words to edit. The method will work whether the writer or editor searches one, two, a few, or several paragraphs at a time. The writer or editor selects the number of sentences to examine at each pass. The invention searches the desired number of paragraphs in four stages, by interacting with the writer or editor. At each stage, the invention implements one or more lists.

The Stage One is the first routine of the method and includes two components: at a block 20, the first component comprises a list of the eight signs that indicate a likelihood of unnecessary words: "it," "there," "in," "of," ".," "as," "or," and "that." At blocks 22, 24, 26, and 28, the second component comprises lists of typically unnecessary phrases that contain one or more of these eight signs, plus lists of typical cliches, redundancies, weak construction, unnecessary words, and pairings of words in which the first word is unnecessary. At the block 22, the method 10 searches the sentence in question for entries on a list of commonly used unnecessary phrases and removes them accordingly. At the block 24, the method 10 uses a similar search for common cliches, and makes suitable replacement from the list. At the block 26, a similar search locates common lengthy constructions and replaces them with pared down constructions for livelier prose from the list. Finally, at the block 28, the similar search finds common redundant pairs and again makes suitable substitution. Among the paragraphs the invention searches for the eight signs, plus matches to the words, phrases, and weak construction on the lists.

In one presently preferred embodiment, a computer software program selects a portion of the writer's text to examine. Upon selection, the program searches for the listed signs and then marks them by either highlighting or dimming the signs and matches found on the lists for the writer to consider deleting. Dimming is one presently preferred means of executing the marking process. One of the most difficult aspects of writing well is seeing what does not need to be in the sentence. By dimming the likely candidates, the invention in this presently preferred embodiment allows the writer to see more easily how the sentence might appear without these words and often realize that without them the sentence still conveys the meaning the writer intended.

Completing Stage One makes the writing clear and concise. When the writer has reviewed the marked words and deleted the unnecessary ones, the writing now contains less clutter, and the writer instructs the invention to begin Stage Two.

In Stage Two, at a block 30, the invention ceases to mark the unused signs from Stage One and begins to search for and mark the suffix "ion"; the seven "to be" verbs, "am," "is," "was," "were," "are," "been," and "be"; and at a block 32, the word "of" (again). The writer examines each marked word or suffix, looking for nominalizations, at a block 34, passive voice, at a block 36, and the weak construction often found around "to be" verbs, at a block 38.

Completing Stage Two enlivens the writing. After the writer has converted passive voice to active and nominalizations to verbs, or decided to leave them, the writer now instructs the invention to proceed to Stage Three.

In Stage Three, the invention ceases to mark the unused signs from Stage Two and begins to search for and mark all remaining prepositions, excluding "of" and "in." With the prepositions thus marked, the writer reviews each to see if it begins a prepositional phrase that over explains and therefore is unnecessary, at a block 40.

Completing Stage Three fine-tunes the writing. After reviewing the marked prepositions and deleting more unnecessary words, the writer tells the invention to continue to Stage Four, where the invention searches each sentence for pairs of commas separated by more than three words, at a block 50, the same or synonymous nouns and verbs appearing more than once, at a block 52, more than one negated verb within a sentence, at a block 54 and the word "any" following a negated verb, at a block 56.

Completing Stage Four smoothes the writing and carries the reader forward.

Text supporting the method might also include an explanation of each sign and what it means to the writer. The method cannot simply look for and eliminate words as has been the practice in the prior art. Often the signs themselves do not offend the reader; they do not exemplify poor writing; they do not even mean there is a problem; the signs signal there might be a problem, and based on mathematical probability, the writer often enough will find something to improve that taking a closer look at those signs is worth the writer's time.

Stage One

It

The word "it" signals a clump of words the writer can usually remove or replace with fewer words. Typically, the "it" appears at the beginning of a sentence, or at the beginning of a clause. If the "it" is a pronoun referring to something, like a tree, then the writer ignores the sign. Rarely, an "it," even though not a pronoun, will remain, as in, "It was hot."

Although "that" appears as another sign in Stage One, it also serves as a supporting sign accompanying "it." The word "that" usually follows an "it" by a few to several words as illustrated in all four examples below. If the word "that" does not follow an "it," the "it" and the next word to a few words may still come out, as in, "I write to discover what it is I have written." The word "that" reinforces the probability of removing all or part of the clause beginning with "it." For example:

It should be stated that the party did not have to register its candidate before the deadline.

It was the position of Smith that Explorers are no more dangerous than the average car.

Tom Williams was a good friend, and it was on the strength of his reputation and recommendation that I was given a teaching-writing fellowship.

It was most likely that the prisoner escaped by posing as a guard.

If "that" appears in the sentence, the writer does one of three things:

1. deletes all of the words, from "it" through "that," as demonstrated below in Example 1;

2. replaces the "it" and the words following with one or two words that mean the same thing, usually keeping the word "that," as seen below in Example 2; or
3. deletes the "it" and the "that" and one or two other words (which most often will include a "to be" verb), but keeps the words with meaning, as illustrated below in Examples 3 and 4.

Using these three alternatives, the author can immediately improve the sentences as follows:

The party did not have to register its candidate before the deadline.

Smith contended that Explorers are no more dangerous than the average car.

Tom Williams was a good friend, and on the strength of his reputation and recommendation I was given a teaching-writing fellowship.

Most likely, the prisoner escaped by posing as a guard.

Referring to FIG. 2 a list 70 of weak formulations including the word "it" is presented. A simple template search will find these formulations and remove them without doing violence to the meaning of the sentence.

Figure 3:
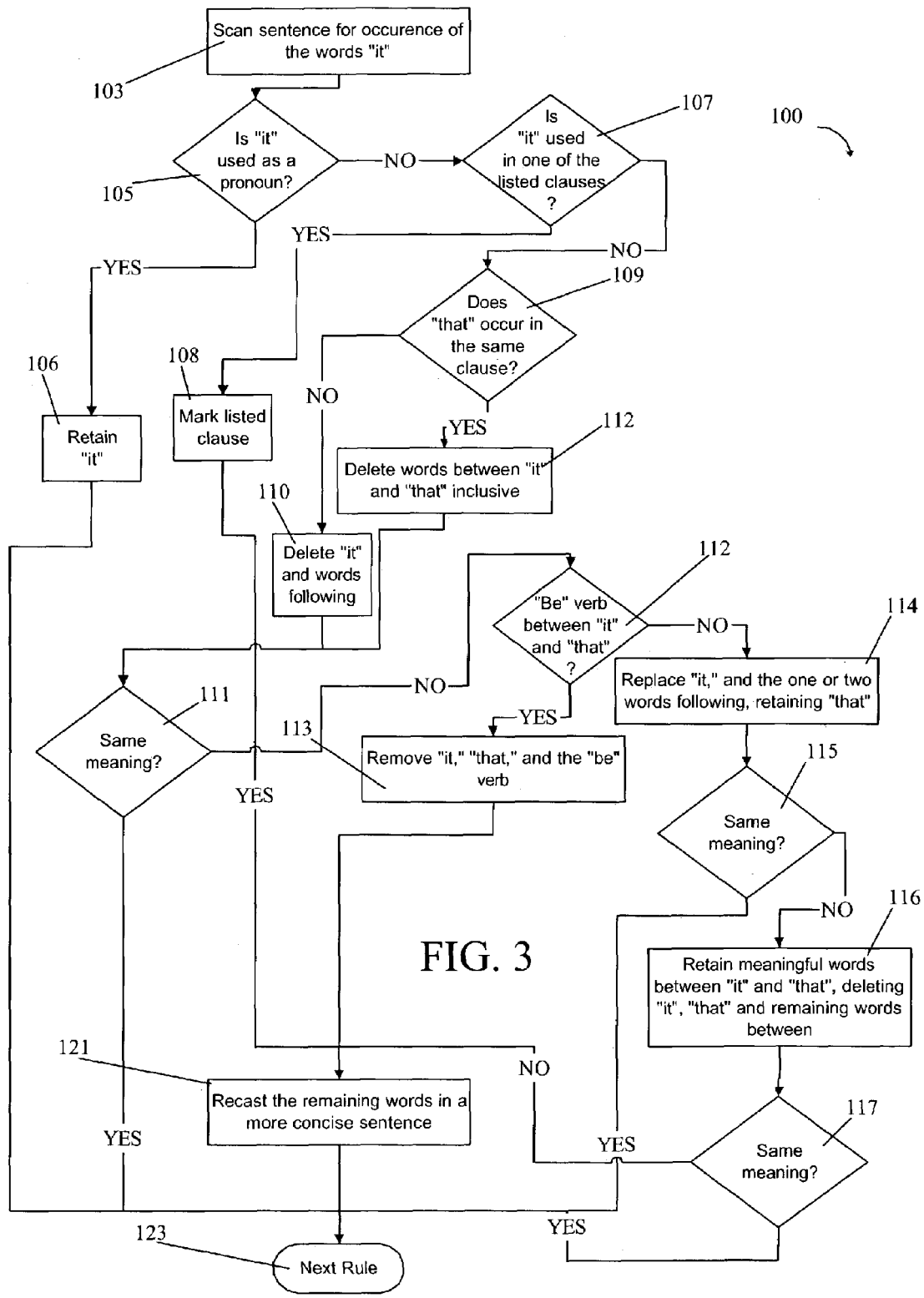
FIG. 3 illustrates stage 1 processing steps associated with the word "it."

Referring now to FIG. 3. The method 100, at a block 103, searches for the word "it." If the method finds an "it" at a block 105, then the method at a block 107 asks if the "it" is a pronoun. If the "it" is a pronoun, at a block 106 the method decides to keep the "it." At a block 123 the method moves to the next rule.

If the method determines that the "it" is not a pronoun, then at a block 107 the method tries to match the "it" and the few words following to a list of typically unnecessary phrases or weak constructions that begin with "it." If the method finds a match at a block 107, it dims the words at a block 108, so the writer can read the rest of the sentence without those words. At a block 121 the writer probably deletes the match.

If the method finds an "it," the "it" is not a pronoun, and the "it" and the words following do not match an entry from the list, then the method, at a block 109 searches for the word "that," starting with the second word after the "it" and continuing for several words. If the method finds no "that" following the "it," the writer removes the "it" and one to a few words following at a block 110. If at a block 111, the sentence still retains its meaning, the writer retains the sentence having deleted "it" and the one to a few words following, and proceeds to the next rule at the block 123.

Where the method finds a "that" at the block 109, at a block 110, the writer removes the "it" and the "that" and the words between at a block 112. If the sentence still retains its meaning, the writer retains the sentence having deleted the "it" and the "that" and the words between at a block 111 and proceeds to the next rule at the block 123. If the sentence does not retain its meaning, the writer at a block 112 examines the words between "it" and "that" to locate form of the verb "to be." If a form of "to be" is present, the writer removes the "it", "that", and the "to be" form at a block 113. With the remaining words, at the block 121, the writer will recast the remaining words into a sentence. Once complete, the method moves to the next rule at the block 123. Where no for of "to be" is present, the writer, at a block 114, tries to replace the "it" and the words following with one or two words meaning the same thing, usually keeping the "that."

If the writer cannot get rid of all of the words at the block 113 or replace them with other words at block 114, the writer at block 116 tries to keep the one or two words with meaning between the "it" and the "that," and deletes the other words, including the "it" and the "that". If the writer cannot delete some of the words without the sentence losing meaning, the writer keeps the words from the "it" through the "that" and proceeds to the next rule at the block 123.

If the sentence after removal of the "it", "that", and the remaining words, at the block 116, at the block 121, the method recasts the remaining words in a more concise sentence. At the block 123, the method moves to the next rule.

There

Referring to FIG. 4 a list 124 of weak formulations including the word "there" is presented. A simple template search will find these formulations and remove them without doing violence to the meaning of the sentence.

Although encountered less frequently than "it," the word "there" signals a clump of words the writer can usually remove or replace with fewer words. Sometimes, a "there" will remain, as in, "There went my last dollar." Typically, the "there" appears at the beginning of a sentence, or at the beginning of a clause.

The word "that" usually follows a "there" by a few to several words, as illustrated in the example below. If the word "that" does not follow a "there," the "there" and one to a few words nearby may still come out For example, "There are few situations in which the idea would work." becomes, "The idea would work in few situations." The word "that" reinforces the probability of removing all or part of the clause beginning with "there." If "that" appears in the sentence, the writer usually deletes the "there" and the "that" and one or two other words (which most often will include a "to be" verb), but keeps the words with meaning:

There are three principles that help to resolve this issue.

Paying heed to the needless "There are" phrase yields:

Three principles help to resolve this issue.

Figure 5:
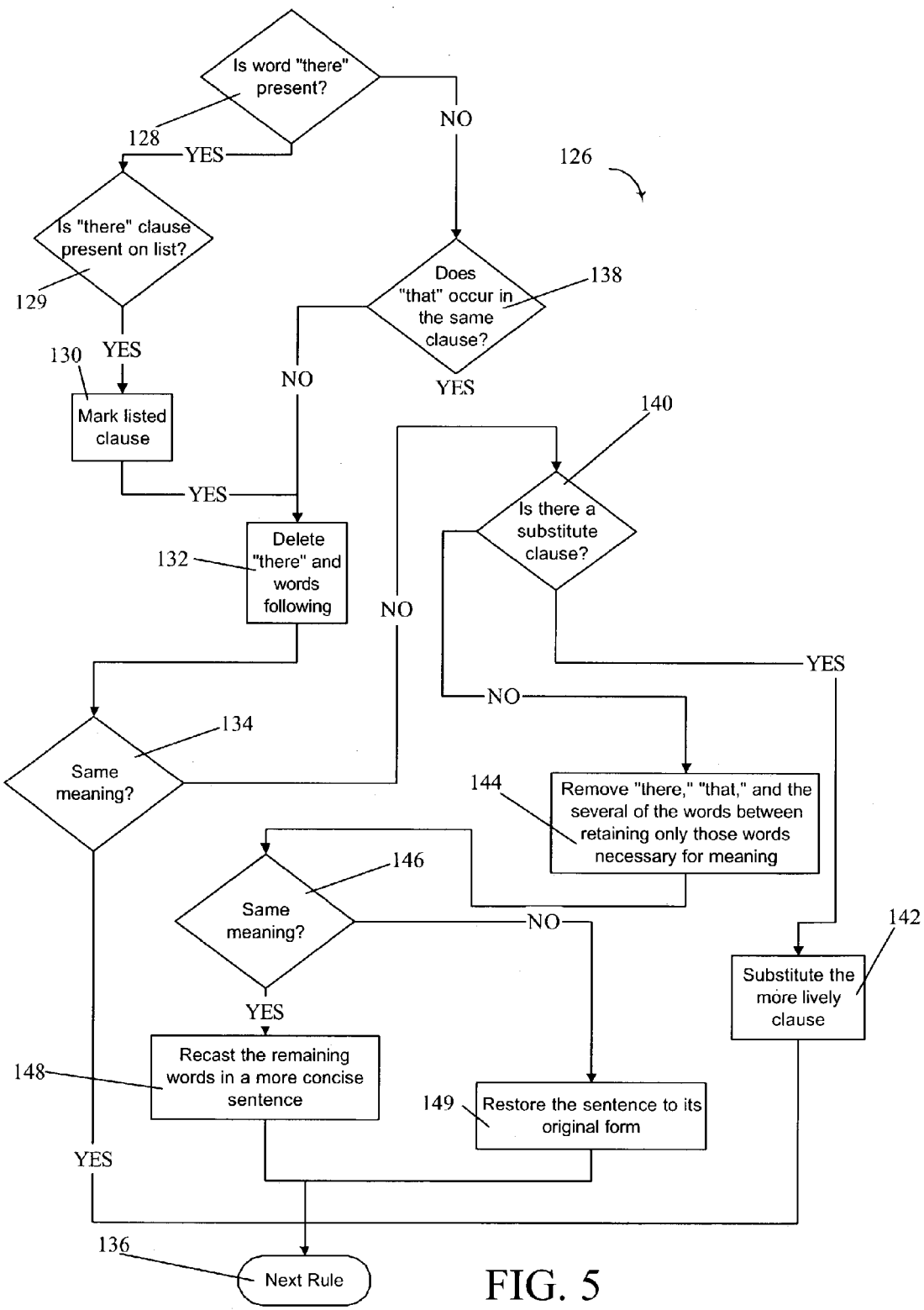
FIG. 5 illustrates stage 1 processing steps associated with "there."

Referring now to FIG. 5, a method 126 searches at a block 128 for the word "there." If at the block 128 the method finds a "there," the method tries at a block 129 to match the "there" and the few words following to any entry on a list of known, weak constructions beginning with "there." If the method finds a match at a block 129, the method dims the unnecessary words in the weak construction, at a block 130. The writer deletes the unnecessary words at a block 132, checks for the same meaning at a block 134, and then proceeds to the next rule at a block 136. If the method does not find a match, the method at a block 138 searches for the word "that" two to several words after the "there." If the method finds no "that" following the "there," at a block 132 the writer mentally removes the "there" and one to a few words following. If the sentence still retains its meaning, the writer at a block 136 proceeds to the next rule.

If the method finds a "that" at a block 140, the writer tries to replace the word "there" and the one to several words following with one or two words that mean the same thing. In many instances, there is a suitable substitute clause with a livelier clearer meaning, usually keeping the word "that." If such a lively clause exists, at a block 140, the writer substitutes the more lively clause at a block 142, and then proceeds to the next rule at the block 136. If the writer cannot replace the words at block 140, the writer at a block 144 tries to keep one or two of the words between the "there" and the "that" and delete the other words, including the "there" and the "that." The remaining words are recast into a sentence at a block 148. The writer then tests to see if the meaning is the same at a block 146. If so, then at the block 136, the writer proceeds to the next rule. If the writer cannot delete some of the words, the writer at a block 149 keeps all of the them and proceeds to the next rule at the block 136.

IN

Scores of common unnecessary phrases begin with the word "in." For example: in fact, in which, in addition to, in the event, in time, in the amount of, in order to, in his mind. Referring to FIG. 6, a list 143 of weak formulations including the word "in" is presented. A simple template search will find these formulations and remove them without doing violence to the meaning of the sentence. The word "in" suggests that the writer scrutinize the "in" and the one, two, or three words that follow to determine if all or part of the phrase can come out. For example:

Surely there can be little in this world more awful than the spectacle of a strong man in the moment when he is utterly weak and broken.
   In fact, the law in these cases indicates otherwise.

By simply removing the weak "in" clause, as a result of the template search, the following result:

Surely there can be little more awful than the spectacle of a strong man when he is utterly weak and broken.
   The law indicates otherwise.

Sometimes, an "in" and the one, two, or three words following should remain. Sometimes one word replaces an "in" and the one, two, or three words following. For instance, "in the event" becomes "if," "in the amount of" becomes "for," and "in the course of" becomes "during" or "when." Occasionally, one word remains. For instance, "in an effort to" becomes "to." The sign exposes many unnecessary words.

Figure 7:
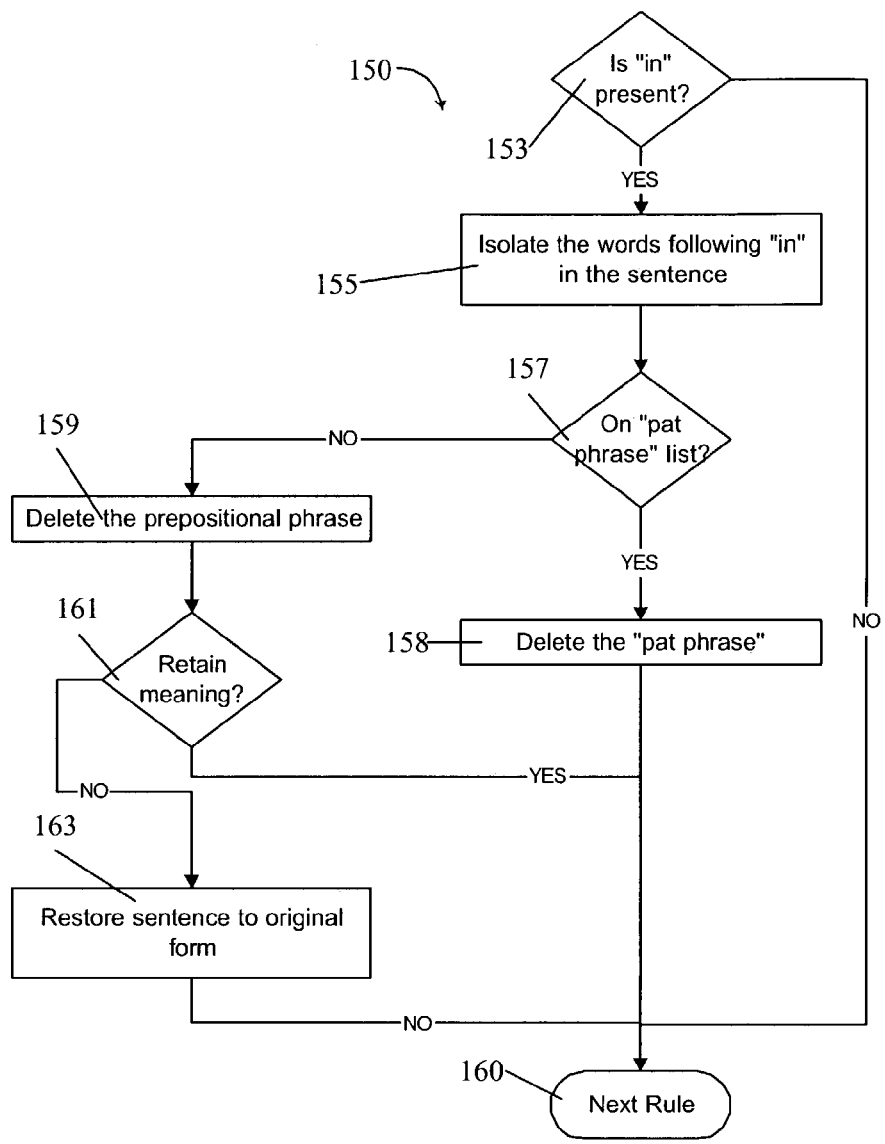
FIG. 7 illustrates stage 1 processing steps associated with "in."

Referring now to FIG. 7, a method 150 commences at a block 153 searching for the word "in." Where the method finds an "in," the method 150, at a block 155, tries to match the "in" and the one to a few words following to any entry on a list of known, unnecessary prepositional phrases beginning with "in." (See FIG. 5.) If the method finds a match at a block 157, the writer deletes the unnecessary prepositional phrase at a block 158, and proceeds to the next rule, at a block 160. If the method finds no match, the writer at a block 159 removes the "in" and the rest of the prepositional phrase. If the sentence still retains its meaning, at a block 161, the writer proceeds to the next rule at the block 160. If the sentence does not retain its meaning, the writer keeps the prepositional phrase at a block 163 and proceeds to the next rule at the block 160.

OF

The word "of" leads the writer to more unnecessary words and phrases than any other sign. It helps the writer see unnecessary words and phrases that are so common most writers don't realize they need to come out. An "of" directs the writer to look to the left and to the right for words to delete. For example:

The purpose of this letter is to remind you that all fiscal year-end reports are due July 30th. The first part of the letter gives you the format for the report.

Simple attention to the presence of "of" yields:

This letter is to remind you that all fiscal year-end reports are due July 30th. The first part gives you the format for the report.

That's better, but the writer could have deleted the words on both sides of each of.

The purpose of this letter is to remind you that all fiscal year-end reports are due July 30th. The first part of the letter gives you the format for the report.

The meaningful portions of the two sentences are:

is to remind you that all fiscal year-end reports are due July 30th.
   gives you the format for the report.

Retaining these meaningful fragments and recasting the sentence yields:

We remind you that all fiscal year-end reports are due July 30th. This gives you the format for the report.

And once the writer gets this far, the writer may edit even further:

All fiscal year-end reports are due July 30th. Please follow this format.

A writer does not try to eliminate "of"s, but rather uses them to spot words with a high probability of being unnecessary. Sometimes a writer sees the word "of" and decides that it and the words around it should remain.

Referring now to FIG. 7, a method 165 at a block 167 searches for the word "of." The method finds an "of" and at a block 169, tests for the presence of a nominalization. Most words that end in "ion" are the noun forms (nominalizations) of verbs: indication, examination, immersion. Nominalizations slow and dull writing, but few people have heard the word. Good writers use verbs to produce livelier, more vivid sentences. A few words end in "ion" but cannot be converted to verbs. They are not nominalizations. Also, a few verbs end in "ion" and should be left alone, e.g., question, function, mention, position. Some nominalizations are necessary, but usually a writer should convert them to verbs. In accord, the method 165, seeks to convert the nominalization into its verb form at a block 171. With the remaining words, at a block 173, the writer recasts the sentence with the nominalization in the converted verb form. Once recast, at a block 179, the method 165 moves on to the next rule.

At a block 175, where no nominalization is present, the method tries to match the phrase formed either by the "of" and the one to three words preceding, or the "of" and the one to three words following to any entry on a list of known, unnecessary phrases containing the word "of." If the method finds a match at the block 175, the method deletes the matching unnecessary phrase at a block 177 and proceeds to the next rule at the block 179. If the method does not find a match, the writer at a block 181 removes the phrase ending with "of" to create a first exemplar. At a block 183 the writer deletes the phrase beginning with "of" from the original sentence to create a second exemplar. The method 165 weighs the first and the second exemplars at a block 185 to decide which best expresses the meaning intended. The method 165 selects the better exemplar at either a block 187 or 189, according to the weighing process. The method then compares the selected exemplar at a block 191, choosing either the exemplar, at a block 195, or the original, at a block 193, according to the weighing process and then moves on to the next rule at a block 179.

AS

Although the word appears less frequently than "in" and "of," similar to those words, "as" usually signals a small clump of unnecessary words—as to, as such, as a general matter. The unnecessary words may appear on either side of the "as," or with a short phrase containing a double "as." A list of examples is set out at FIG. 9a. Like all signs, sometimes an "as" means nothing, but most of the time the "as" and words around it should come out:

The following are regarded as part of your normal overhead.
   Many artists have used art as a medium to comment on social injustice.
   Is each sentence as concise and direct as possible?
   Removing "as" results in:
   The following are part of your normal overhead.
   Many artists have used art to comment on social injustice.
   Is each sentence concise and direct?

Figure 10:
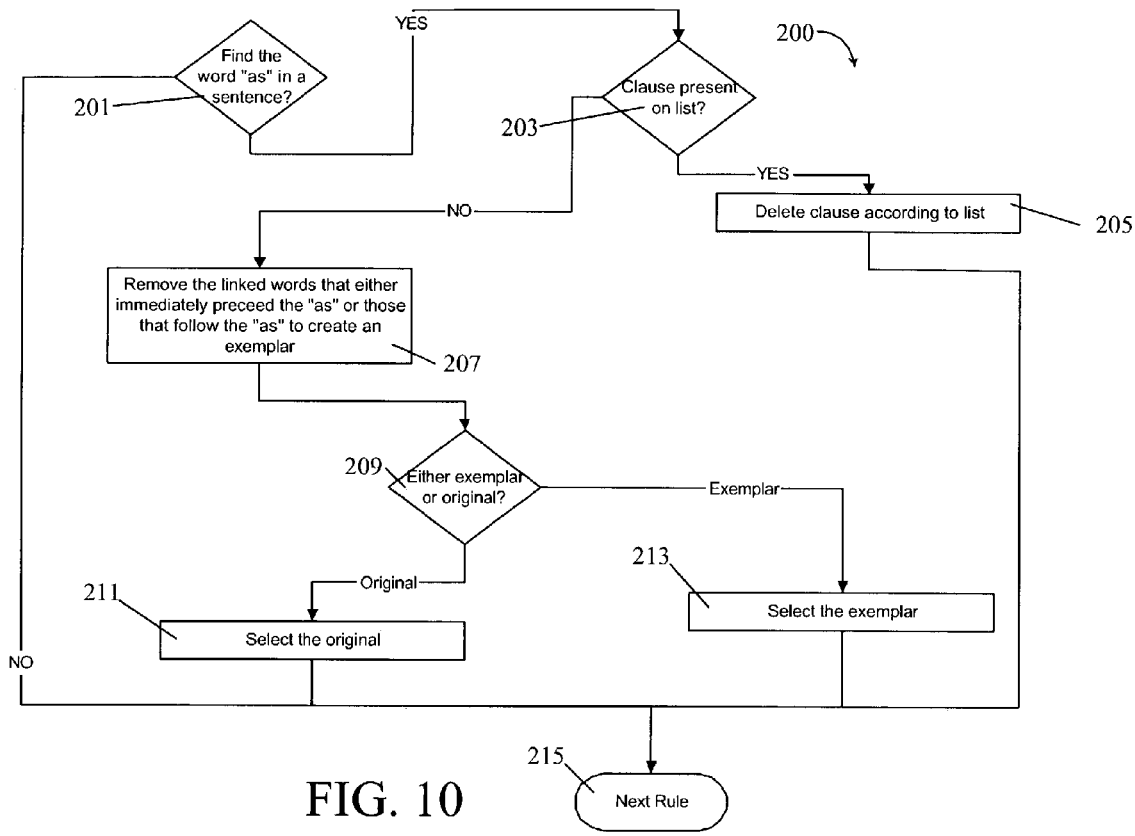
FIG. 10 illustrates stage 1 processing steps associated with "as."

Referring now to FIG. 10, a method 200 at a block 201 searches for the word "as." If no "as" is present, the method 200 proceeds to the next rule at a block 215. Where "as" is present, the method at a block 203 tries to match the "as" and the one to a few words following to any entry on a list of known, unnecessary phrases containing the word "as" and weak constructions containing two "as's" (FIG. 9a). If the method finds a match at a block 205, the writer deletes the unnecessary phrase or the unnecessary words in the weak construction. If the method finds no match, the writer removes the phrase or eliminates the weak construction to create an exemplar at a block 207. If the sentence retains its meaning, the writer deletes the unnecessary phrase or the unnecessary words in the weak construction at a block 209, the method 200 selects the exemplar at a block 213 and proceeds to the next rule at the block 215. If the sentence does not retain its meaning, the writer keeps all of the words at a block 211 and proceeds to the next rule at a block 215.

OR

"Or" and the words following usually repeat the word or few words immediately preceding the "or" and therefore are unnecessary. A classic example is, "I don't know whether or not I am going." Other examples:

She could not remember if she had or had not filed the report.

In a few words or less he told them about his trip.

Recognizing "or" as introducing a redundancy, removing it and the clause it introduces results in:

She could not remember if she had filed the report.

In a few words he told them about his trip.

Sometimes the "or" and the one to a few words that follow are necessary: "He could either pull his emergency chute out by hand, or auger into the wheat field below." But most of the time a writer can remove those words.

Figure 11:
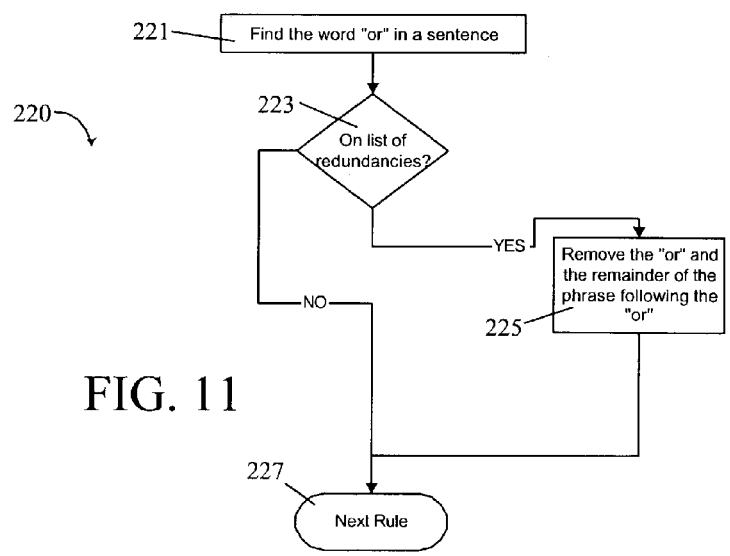
FIG. 11 illustrates stage 1 processing steps associated with "or."

Referring now to FIG. 11. A method 220 at a block 221 searches for the word "or." The method finds an "or" at a block 223 and tries to match the "or" and the one to a few words following to any entry on a list of known, unnecessary phrases beginning with the word "or" FIG. 9b. If the method 220 finds a match at a block 223, the method deletes the unnecessary phrase at a block 225. If the method does not find a match, the writer keeps all of the words and proceeds to the next rule at a block 227.

THAT

The word "that" helps to spot unnecessary phrases beginning with "it" or "there." "That" also appears frequently with weak constructions containing "to be" verbs that are not passive and do not indicate nominalizations. A writer should also examine the word "that" and those words around it for more words to delete. For example:

The simple fact was that no one had ever attempted to perform the trick.

Once the writer is alerted to the lack of additional information in the first clause ending in "that," the writer transforms the sentence to:

No one had ever attempted to perform the trick.

Sometimes the word, by itself, is often unnecessary, as in this example:

The iceberg was apparently as large as the one that they first saw.

Other times, only the presence of the word "that" is offensive to the flow of the sentence:

The iceberg was apparently as large as the one they first saw.

Figure 12:
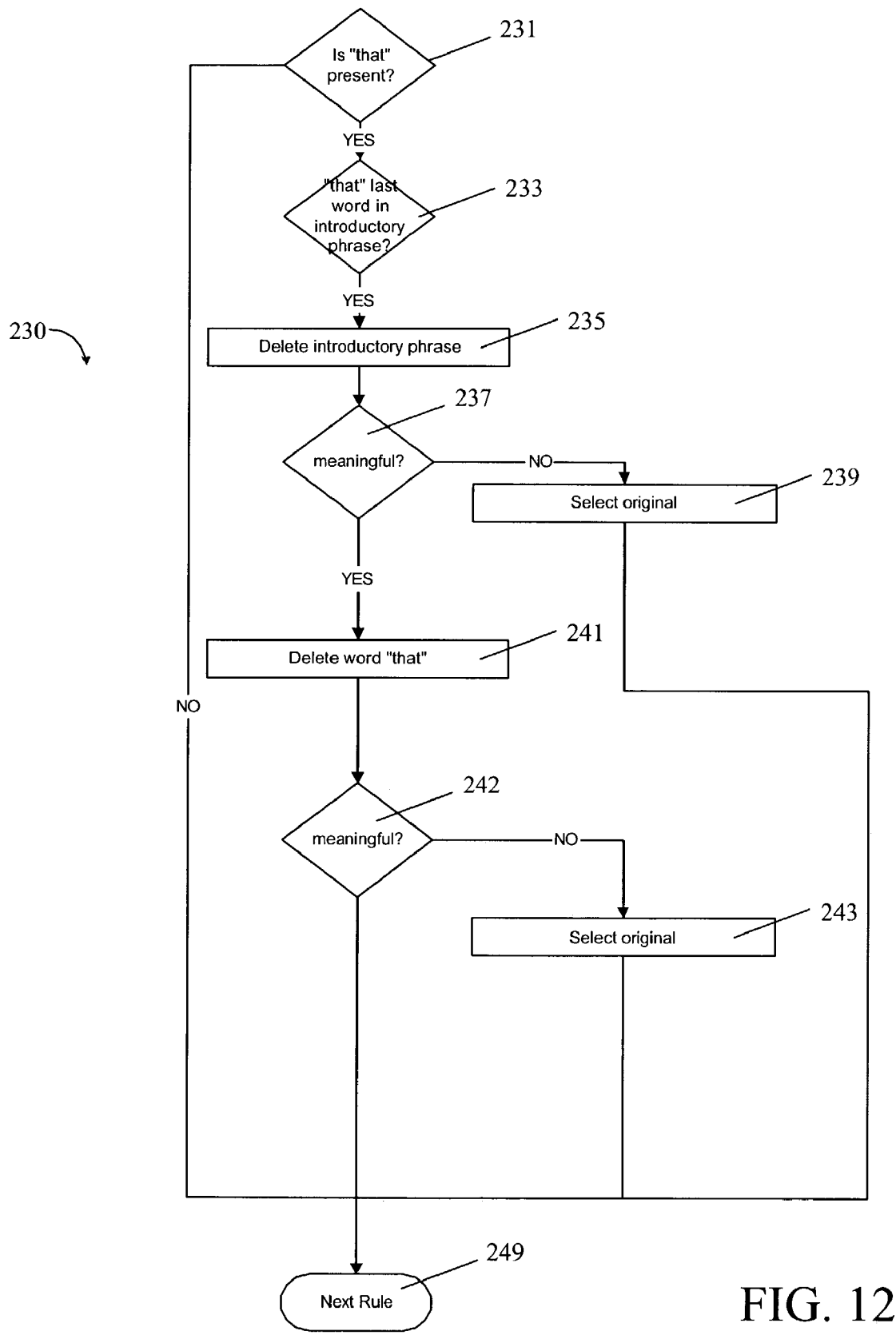
FIG. 12 illustrates stage 1 processing steps associated with "that."

Referring to FIG. 12. A method 230 at a block 231 searches for the word "that." If the "that" follows an "it" or a "there" by three to eight words is the last word of an introductory phrase with no "it" or "there" at the beginning, then the writer at a block 235 removes the introductory phrase. If the sentence retains its meaning at a block 237, the writer proceeds to the next rule. If the sentence does not retain its meaning, the writer keeps all of the words at a block 239 and proceeds to the next rule at a block 249. If the "that" is not the last word of an introductory phrase with no "it" at the beginning, then the method at a block 241 removes the "that." If the sentence retains its meaning, the writer at a block 249 proceeds to the next rule. If the sentence does not retain its meaning, the writer keeps the "that" at a block 243 and proceeds to the next rule at a block 249.

{.}

A writer should find each period and examine the few words that precede it. At the end of a sentence, the writer will often find "over-explaining," which is a major problem with all writers.

Over-explaining does not mean rambling for pages; it means using one, two, three, four, sometimes even more words that go beyond the point at which a reader already understands.

For example, the original version of the previous sentence read:

Over-explaining does not mean rambling for pages about some theory the writer has; it means using one, two, three, four, sometimes even more words that go beyond the point at which a reader already understands what the writer is talking about.

Sentences are crisper, move faster, and sometimes become more dramatic, if the writer removes words that go beyond the point of understanding.

Most over-explaining occurs at the end of a sentence, which is logical: The writer has written beyond where the sentence could have ended. Usually the over explaining will form a prepositional phrase or a string of prepositional phrases, as in Examples 1 and 2. Sometimes the over explaining is not a prepositional phrase, as in Example 3. In Example 3, the writer may choose between "as though it were hot" and "as though it had burned him."

1) My biceps was being crushed to a pulp.
2) He was fully clothed, though his shirt was ripped open in front.
3) "'Drop it!' Wolf Larsen cried, and the hunter dropped it as though it were hot and had burned him."

Removing the over-explaining yields:

1) My biceps was being crushed.
2) He was fully clothed, though his shirt was ripped open.
3) "Drop it!" Wolf Larsen cried, and the hunter dropped it as though it were hot.

Figure 13:
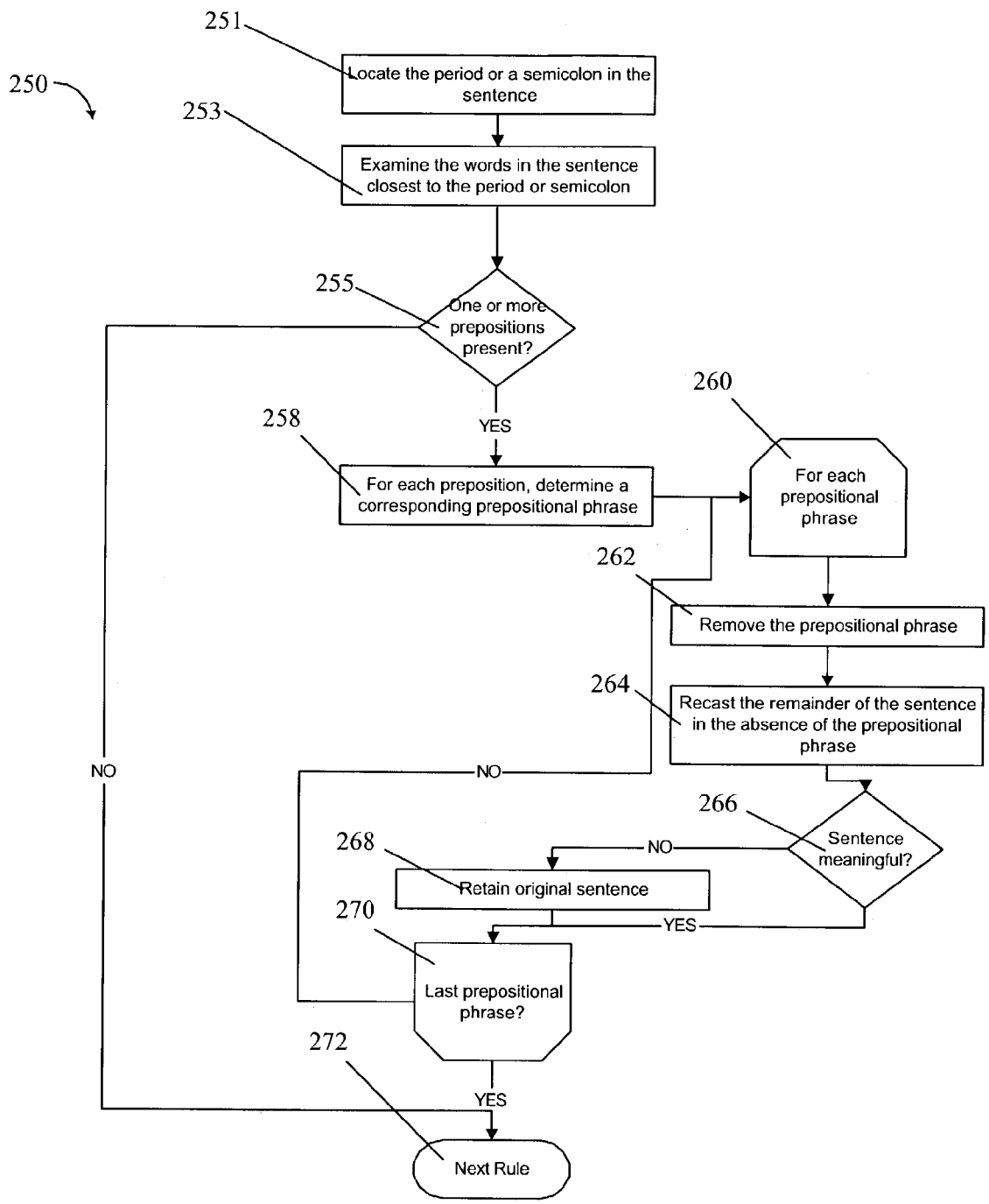
FIG. 13 illustrates stage 1 processing steps associated with periods and semicolons.

Referring to FIG. 13. A method 250 at a block 251 searches for the punctuation "." or ";". Among a group of up to eight words immediately preceding the period or semi-colon, the method 250 at a block 253 searches backwards, beginning with the first word before the period, trying to match one or more words to any entry on a list 273 of known prepositions. (FIG. 14). If the method 250 finds a preposition, at a block 255, the method 250 examines the prepositions one at a time, starting with the preposition closest to the period or semi-colon; first the last preposition before the semi-colon or period, then the second the next-to-last preposition before the semi-colon or period, and so on, back to the eighth word. In a block 258, the method then identifies each prepositional phrase corresponding to each preposition located. In a block 260, the method 250, begins a loop starting with the prepositional phrase corresponding to the first preposition. The method 250 removes each prepositional phrase in its turn at a block 262, one at a time. Once the prepositional phrase is removed, the method recasts the remaining words into a new sentence at a block 264. The method 250, tests the recast sentence for meaning at a block 266. If the meaning is lost, the method selects the original sentence for further analysis at a block 268. If, on the other hand, the sentence retains its meaning, the method 250 retains the recast sentence for further analysis. In either instance, the method checks to determine whether this is the last prepositional phrase at a block 270 and if not, the method analyzes the next prepositional phrase at the block 260.

Once the method 250 determines the sentence as finally recast retains its meaning without one or more of the prepositional phrases the writer at a block 262 proceeds to the next rule at a block 272.

Unnecessary Words

In the removal of unnecessary words exactly mimics the method 220 set out above for removing redundancies set out in FIG. 11, blocks 221 through 227. For each of the following unnecessary words or phrases, the method finds the particular word or words in the sentence by comparison to the list at the block 221. When located on the list at the block 223, the method 220 removes the located word or words at a block 225, and proceeds to the next rule at a block 227.

The same unnecessary words appear over and over in poor writing. The method can categorize and list 274 (FIG. 15) these words to compare to the words a writer uses. Where matches occur, the method can mark the words for the writer to consider deleting.

In casual conversation, people sometimes speak in cliches because they can connect quickly, but on paper clichés sound trite and dull, as in, "Here is the bottom line." and "But that's just the tip of the iceberg." Good writers avoid clichés. A list 275 (FIG. 16) of clichés to avoid is presented.

A redundancy modifies another word. Although a redundancy is repetitious, the repetition occurs as the redundancy repeats the essence of the word it modifies. Because a redundancy repeats the essence of another word, it is unnecessary, for instance, "mandatory requirement" and "excess verbiage." Effective writers avoid redundancies. A list 276 of common redundancies (FIG. 16) is presented.

The more unnecessary words a writer puts into a sentence, the harder the reader has to work to find the meaning. A list 277 (FIG. 17) of phrases that typically should be shorter is presented. Many common words frequently add no meaning to the sentence and therefore are unnecessary, like "basically" and "just." A writer should delete them.

More unnecessary words find their way into poor writing when a writer chooses a bloated expression that could reduce to one or two words, for instance, "is indebted to" becomes "owes," and "at the time" becomes "when." A list 278 (FIG. 17) of word pairs in which the first word typically is unnecessary is presented. A good writer will use the more succinct expression.

Last, a writer can cut in half even certain pairings of words. For example, "In this book authored by Ernest Hemingway . . . ." Or, "You will find detailed instructions provided in the handbook."

The writer now directs the method to begin Stage Two.

STAGE TWO

TO BE

The seven "to be" verbs—am, is, was, were, are, been, and be—serve three purposes: First, and foremost, a writer uses "to be" verbs to find passive voice. The presence of a "to be" verb does not mean a sentence is passive; it means the sentence has a significant probability of being passive. Passive voice slows and dulls sentences. It is a device writers should use in one of only four circumstances. If none of those circumstances exists, the writer should always write in the active voice, which is more vivid and moves the sentence (and the reader) along faster. Too often, writers use the passive voice without realizing it, and their writing sounds dull.

Passive voice is not mysterious. A passive sentence simply reverses the order of an active sentence:
Active:
I hit the ball.
  actor-act-object
Passive:
The ball was hit by me.
  object-act-actor
Sometimes, a passive sentence has no actor:
The ball was hit.

A writer can easily recognize passive voice. Whenever a writer sees one of the seven "to be" verbs (in the example above "was"), the writer performs a two-part test: Part one, the writer looks immediately to the right for a "strong verb" ("hit") (occasionally, one word will separate the "to be" verb and the "strong" verb to modify the "strong" verb, e.g., "was not hit," or "is purposely placed").

If a writer does not see a strong verb immediately to the right (or separated by one word to the right), then the sentence is not passive, and the writer looks for two other problems (discussed below) often revealed by "to be" verbs.

If a writer sees a "strong" verb to the right of the "to be" verb, then, part two, the writer looks to the left for the "object" of the "strong" verb ("ball"), which may be the immediately preceding word or may be several words before. If the writer sees an object to the left, completing the object-act-actor or object-act construction, then the writer knows the sentence is passive.

A writer wants or has to write in the passive voice when one of four circumstances arises:
1) the writer does not know the actor;
2) the writer knows the actor but does not want to reveal the actor;
3) the writer wants to emphasize the actor by placing it at the end of the sentence;
4) the writer decides that writing in the active this time is awkward and so prefers the passive Second, the writer uses "to be" verbs to spot nominalizations. Nominalizations appear in a sentence because the writer has used the noun form of a word instead of the verb. When a writer uses the noun form, the writer must create a new verb to support that noun, and that new verb will often be a "to be" verb. For example:
This is an indication of more serious problems.
This indicates more serious problems.

If the writer sees a "to be" verb, and, testing it first for passive voice, determines that the word immediately to the right ("an") is not a "strong" verb, and therefore that the sentence is not passive, then the writer continues searching to the right, two, three, four, five words, for a nominalization ("indication"). The writer may decide to leave the nominalization, or change it, as should happen here, to "indicates."

A few words end in "ion" but cannot be converted to verbs. See FIG. 18. They are not nominalizations. Also, a few verbs end in "ion" and should be left alone, e.g., question, function, mention, position. Some nominalizations are necessary, but usually a writer should convert them to verbs.

If a nominalization is capitalized, e.g., "Proposition 65," or the "ion" in a singular word does not appear at the end of the word, e.g., "positioning," the method ignores the "ion." If a nominalization is plural or modified, the method will convert it to a verb less often than it will a singular nominalization. Once the method marks a nominalization, the writer may then decide which form of the word works better, the noun or the verb. Usually, it will be the verb, but there are exceptions. For example, the writer may prefer to write, "He gave them directions." rather than, "He directed them."

The word "engaged" often precedes a nominalization: engaged in intimidation, engaged in bargaining, engaged in harassment. Although the method would spot the first because of the "ion," the method would not spot the other two without the warning word "engaged." A list 349 (FIG. 19) of the phrases containing nominalizations that do not end in "ion." Other signs, discussed below, also help to find nominalizations.

Around some nominalizations, two or all three of the signs appear, an "of," a "to be" verb, and the suffix "ion." Around others, there are no signs, although most nominalizations will have at least one for the method to spot.

Third, if the writer sees no strong verb to the right of the "to be" verb and no nominalization further to the right, then the writer looks for something else around the "to be" verb to delete. Sometimes this shows as a pattern of weak construction, either where one of the articles, "a," "an," or "the," follows the "to be" verb by one or two words and in turn is followed by the word "that," or "who," or "where," or "one"; or where the "to be" verb is followed by the word "one" and the word "that" or "who." For example:

1) This is a car that will last a good ten years.
2) They were a family who liked to camp.
3) That was a hotel plan where meals were included.
4) The old bicycle was a rusty one.
5) This horse is one that can run.
6) The girl was one who should have never left home.

Removing the nominalization results in much clearer prose.

1) This car will last a good ten years.
2) They liked to camp. OR The family liked to camp.
3) On that hotel plan meals were included. OR That hotel plan included meals.
4) The old bicycle was rusty.
5) This horse can run.
6) The girl should have never left home.

Figure 18:
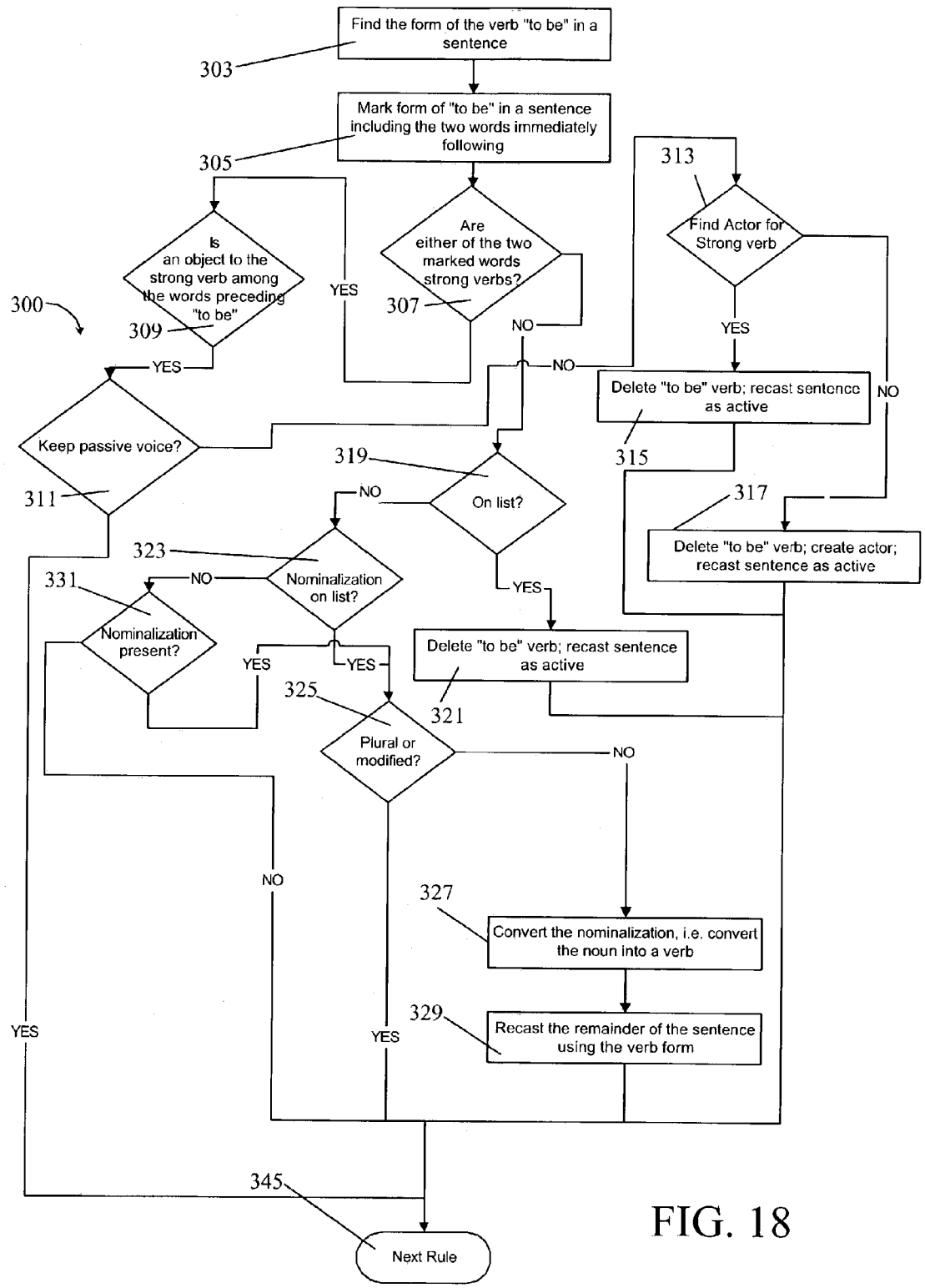
FIG. 18 illustrates processing steps associated with stage 2 of the process of FIG. 1.

Referring now to FIG. 18, a method 300 at a block 303 searches for all "to be" verbs: "am," "is," "was," "were," "are," "been," and "be." The method dims the "to be" verb at a block 305 and marks the two words immediately following. At a block 307, the method decides if either marked word is a "strong" verb. If one is, at a block 309 the writer examines the words preceding the "to be" verb for an object to the marked word. If the method finds the object at a block 309, confirming that the verb is passive, the writer at a block 311 decides whether to keep the verb passive or make it active. If the writer decides to keep the verb passive at a block 311, the writer continues to the next rule at a block 345. If the writer decides to make the verb active at block 311, then at block 313 the method 300 searches the words following the "strong" verb for an actor. If the writer finds an actor at a block 313, the writer deletes the "to be" verb at a block 315, keeps the "strong" verb (and the word between the "strong" verb and the "to be" verb, if there is one), moves the object to a position after the "strong" verb, and moves the actor to a position before the "strong" verb, and deletes any words made useless by the conversion, before continuing to the next rule. If the writer does not find an actor following the "strong" verb, the writer deletes the "to be" verb at a block 317, keeps the "strong" verb (and the word between the "strong" verb and the "to be" verb, if there is one), moves the object to a position after the "strong" verb, and creates an actor, placing it before the "strong" verb, and deletes any words made useless by the conversion, before continuing to the next rule at a block 345.

If neither marked word following the "to be" verb is a "strong" verb at block 307, the method at a block 319 tries to match the "to be" verb, plus the three words preceding it and the five words following it, to any entry on a list of known weak constructions containing a "to be" verb, an article or the word "one," and the word "who," "where," "one," or "that." If the method 300 finds a match, the method deletes the matching words at a block 321 and proceeds to the next rule.

If the method does not find a match at block 319, beginning with the second word after the "to be" verb, the method 300 at a block 323 tries to match any of the next five words to any entry on a list 350 (FIG. 20) of known nominalizations that do not end in "ion." If the method 300 finds a match at a block 319, the method examines the nominalization at a block 325 to see if it is plural or modified or both. If the nominalization is plural or modified or both, the writer probably will keep the nominalization and proceed to the next rule at a block 345. If the nominalization is neither plural nor modified, the writer at a block 327 probably will convert the nominalization to its verb form, recast the remainder of the sentence using the verb form at a block 329, and proceed to the next rule at a block 345. If the method does not find a match at block 323, beginning with the second word after the "to be" verb, the method 300 at a block 331 searches the next five words for a nominalization. If the writer finds a nominalization, the writer examines it at a block 325 to see if it is plural or modified or both. If the nominalization is plural or modified or both, at a block 345 the writer probably will keep the nominalization and proceed to the next rule. If the nominalization is neither plural nor modified, the writer at a block 327 probably will convert the nominalization to its verb form, recast the remainder of the sentence using the verb form at a block 329, and proceed to the next rule at a block 345. If the writer does not find a nominalization at block 331, the writer keeps the "to be" verb at a block 345 and proceeds to the next rule.

Figure 22:
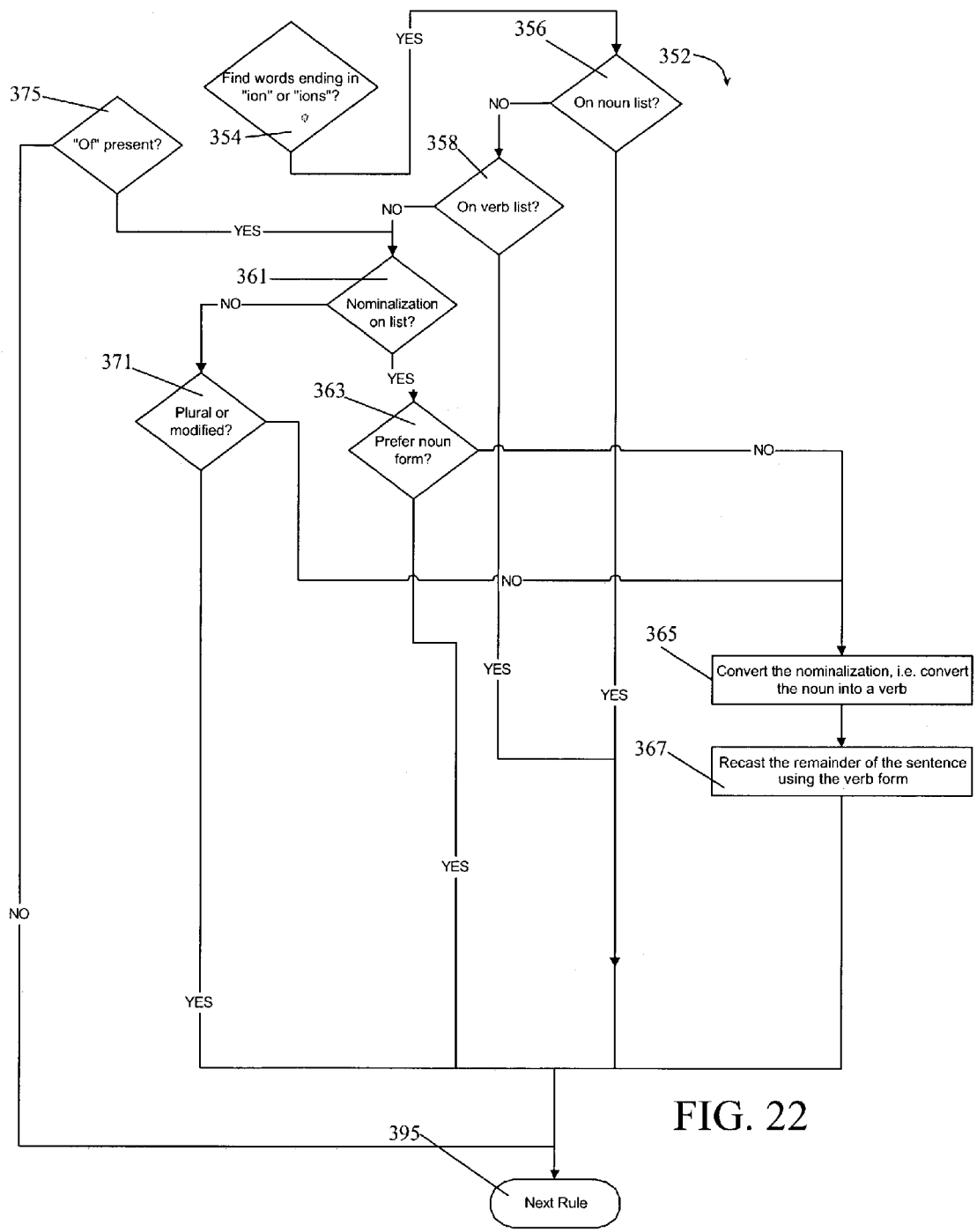
FIG. 22 illustrates stage 2 processing steps associated with block 331 of FIG. 18.

Whether a nominalization is present as set out at the block 331, is not always simply a matter of finding the "ion" ending. Referring now to FIG. 22, a method 352 at a block 354 searches for any word ending in "ion" (or "ions). If at a block 354, the method finds a word ending in "ion," the method at a block 356 tries to match the word to any entry on a list 348 (FIG. 19) of known nouns that end in "ion" but do not have a verb form. If the method 352 finds a match at a block 356, the method ignores the word ending in "ion" and at a block 395 proceeds to the next rule. If the method does not find a match at block 356, the method 352 at a block 358 tries to match the word to any entry on a list of known verbs that end in "ion." If the method finds a match at a block 358, the method ignores the word ending in "ion" and at a block 395 proceeds to the next rule. If the method does not find a match at block 358, the method at a block 361 tries to match the word to any entry on a list of known phrases containing nominalizations that end in "ion."

If the method finds a match at block 361, the method at block 363 dims the phrase containing the nominalization ending in "ion" and places and marks the verb form of the nominalization immediately after it. At a block 363, the writer accepts or rejects the change, converts the nominalization into the verb form at a block 365, recasts the sentence in the verb form at a block 367, and proceeds to the next rule at block 395.

If the method does not find a match at block 361, the method dims the "ion" at a block 371 and marks the rest of the word. The writer examines the nominalization at a block 371 to see if it is plural or modified or both. If the nominalization is plural or modified or both, at a block 395 the writer probably will keep the nominalization and proceed to the next rule. If the nominalization is neither plural nor modified, the writer converts the nominalization into the verb form at a block 365, recasts the sentence in the verb form at a block 367, and proceeds to the next rule at block 395.

Of

Besides helping the writer find words with a high probability of being unnecessary, the word "of" also follows immediately after many nominalizations. In Stage Two, the method uses the sign again to help spot them. For example:
1) have knowledge of (know)
2) offer an indication of (indicate)

Referring again to FIG. 22, a method 352 at a block 375 searches for the word "of." If the method finds an "of" at a block 375 the method marks the "of" at a block 169 and tries to match the word immediately preceding the "of" to any entry on the lists 143 (FIG. 6), 349 (FIG. 19), and 350 (FIG. 20) of known nominalizations, those ending in "ion" and those not ending in "ion." From this point, the process exact tracks the rule as set out in the discussion of nominalizations above.

The writer now directs the method to begin Stage Three.

STAGE THREE

Remaining Prepositions

Prepositional phrases often inhabit sentences but add no meaning. As explained above, writers typically find these phrases (over explaining) at the end of a sentence, but they also appear elsewhere. To locate these other unnecessary words, the writer now combs the rest of the sentence for the common prepositions 273 (FIG. 14), like "at," "from," "to," "with," "between." The prepositional phrase beginning with one of these words might come out with no loss in meaning. For example:

A frivolous lawsuit by a windfall-seeking plaintiff with virtually no grounds could cost me easily $10,000.

An insurer who pays a loss under its policy acquires a subrogation claim against the wrongdoer.

Removing the over-explaining makes clearer, more active, and more easily read text:

A frivolous lawsuit could cost me easily $10,000.

An insurer who pays a loss acquires a subrogation claim against the wrongdoer.

If a preposition follows a verb, the method would likely leave in the prepositional phrase, because prepositional phrases following verbs are almost always necessary.

Figure 23:
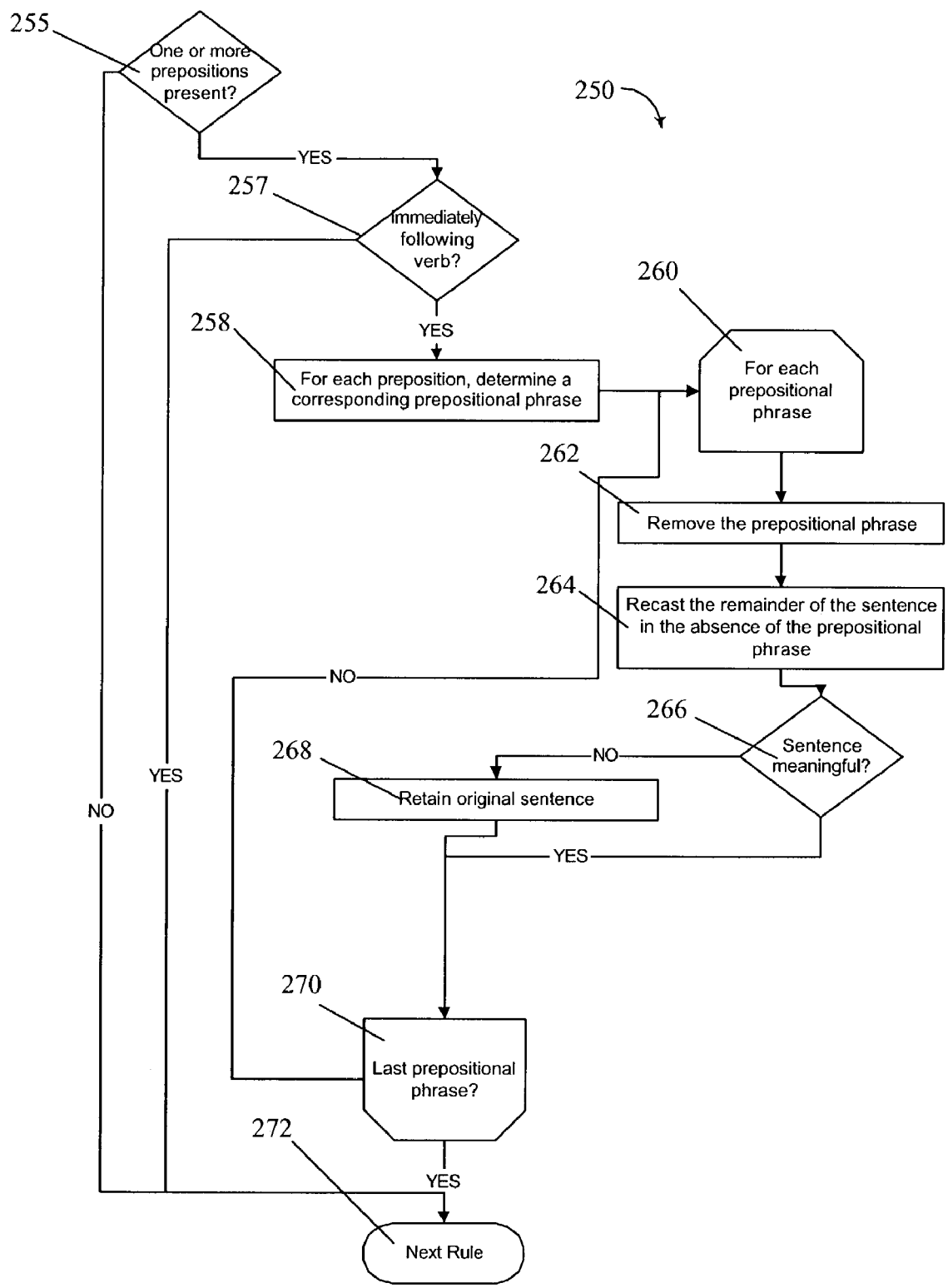
FIG. 23 illustrates processing steps associated with stage 3 in the process of FIG. 1.

Referring now to FIG. 23, the method 250 at the block 255 searches for a match to any entry on a list of known prepositions (which excludes "in" and "of"). If the matched word follows immediately after a verb at a block 257, the method at the block 272 and proceeds to the next rule. If the preposition does not follow immediately after a verb at the block 257, then at the block 258 the method dims the matched word and the word immediately following the matched word, then dims the next three words in a graduated line with each word closer to the matched word dimmer than the word to its right. The writer finds the prepositional phrase among the gradually dimmed words and for each prepositional phrase at the block 260 removes it at the block 262 and recasts the sentence at the block 264. If the sentence retains its meaning at a block 266, the writer proceeds to the next rule at the block 272. If the sentence does not retain its meaning at block 266, the writer replaces the prepositional phrase at the block 268 and keeps the prepositional phrase and at the block 272 proceeds to the next rule.

The writer now directs the method to begin Stage Four.

STAGE FOUR

, - - - ,

A pair of commas within a sentence often signals either unnecessary information (a form of over explaining), or one thought interrupting another thought. Unnecessary information should always come out. Interrupted thoughts confuse and slow readers, and the writer should rearrange the thoughts so that one follows another. After examining the words between the commas, the writer may decide the information is unnecessary:

For the film to come out, rather than remain in the can, the producers must raise more money.

For the film to come out{,} rather than remain in the can{,}the producers must raise more money.

For the film to come out, the producers must raise more money.

If the writer chooses to keep the information, the writer may incorporate the interrupting clause into the flow of the sentence by editing a few words around it, as seen in the following example:

Labor shortages, which had always plagued his road-building efforts in sparsely populated Florida, would be greatly exacerbated here.

To enhance the flow, the writer substitutes "and" for the comma to yield:

Labor shortages had always plagued his road-building efforts in sparsely populated Florida and would be greatly exacerbated here.

If the writer chooses to keep the information but cannot incorporate it into the flow of the sentence with simple editing, then the method moves the interrupting clause to the beginning of the sentence. The writer decides if the information fits better at the beginning. If the writer decides that it doesn't, then the method moves the interrupting clause to the end of the sentence. The writer decides if the information fits better at the end. The clause's content dictates what the writer decides. An interrupting clause containing only a few words may cause little confusion, but a sentence is usually smoother and keeps the reader moving forward if the writer places it in line with the other clauses:

The Plaintiff must plead, as part of its claim, facts that show improper conduct.

as part of its claim, The Plaintiff must plead, facts that show improper conduct.

As part of its claim, the Plaintiff must plead facts that show improper conduct.

Often, when one thought interrupts another, no commas will bracket the interrupting clause. Even without the set of commas, a writer often will still sense the presence of an interrupting clause because the sentence sounds awkward. The awkwardness arises not because the sentence contains too many thoughts or even difficult thoughts, but because one thought appears in the middle of another thought, which makes a sentence confusing. The writer edits the awkward and confusing sentence by searching it for the two words that go together to complete the first thought. Usually those two words are the subject and its verb, or the verb and its object. When the writer identifies those two words, they clearly delineate the interrupting clause, and the writer can delete that clause, edit a few words at the beginning and end to make it fit better, or relocate the clause to make the sentence more accessible, as seen with the example below in steps 1-4. Once the writer has relocated the interrupting clause, minimal editing smoothes out the sentence, as seen with the example below in steps 5-13.

1) Federal courts routinely hold that documents evaluating an employee's performance and recommending certain action regarding that employee are exempt from disclosure.
2) Federal courts routinely hold that documents evaluating an employee's performance and recommending certain action regarding that employee are exempt from disclosure.
3) Federal courts routinely hold that documents are exempt from disclosure evaluating an employee's performance and recommending certain action regarding that employee.
4) Federal courts routinely hold that documents are exempt from disclosure evaluating an employee's performance and recommending certain action regarding that employee.
5) Federal courts routinely hold that documents are exempt from disclosure evaluating an employee's performance and recommending certain action regarding that employee.
6) Federal courts routinely exempt from disclosure documents evaluating an employee's performance and recommending certain action regarding that employee.
7) Federal courts routinely exempt from disclosure documents evaluating an employee's performance and recommending certain action regarding that employee.
8) Federal courts routinely exempt from disclosure documents evaluating an employee's performance and recommending certain action regarding that employee.
9) Federal courts routinely protect documents evaluating an employee's performance and recommending certain action regarding that employee.
10) Federal courts routinely protect documents evaluating an employee's performance and recommending certain action regarding that employee.
11) Federal courts routinely protect documents evaluating an employee's performance and recommending certain action regarding that employee.
12) Federal courts routinely protect documents that evaluate an employee's performance and that recommend certain action regarding that employee.
13) Federal courts routinely protect documents that evaluate an employee 's performance and that recommend certain action regarding that employee.

If the information in an interrupting clause is necessary, cannot be smoothed out to fit the sentence, and will not fit at the beginning or at the end of the sentence, then the writer should consider turning the information into another sentence. Referring back to the example above about labor shortages in Florida, instead of incorporating the interrupting clause into the flow of the sentence, the writer could have used the words better by turning the interrupting clause into its own sentence.

Labor shortages, which had always plagued his road-building efforts in sparsely populated Florida, would be greatly exacerbated here Labor shortages, which had always plagued his road-building efforts in sparsely populated Florida, would be greatly exacerbated here Labor shortages had always plagued his road-building efforts in sparsely populated Florida. Here they would be greatly exacerbated.

Sometimes the writer will find an interrupting clause within another interrupting clause. The following example contains an interrupting clause inside another interrupting clause, an interrupting clause with no commas to set it off, and an interrupting clause that needs to be another sentence:

Viewed from a suitable height, the aggregating clusters of medical scientists in the bright sunlight of the boardwalk at Atlantic City, swarmed there from everywhere for the annual meetings, had the look of assemblages of social insects.

Viewed from a suitable height, the aggregating clusters of medical scientists in the bright sunlight of the boardwalk at Atlantic City, swarmed there from everywhere for the annual meetings, had the look of assemblages of social insects.

medical scientists in the bright sunlight of the boardwalk at Atlantic City, swarmed there from everywhere for the annual meetings, Viewed from a suitable height, the aggregating clusters had the look of assemblages of social insects.

Medical scientists in the bright sunlight of the boardwalk at Atlantic City, swarmed there from everywhere for the annual meetings. Viewed from a suitable height, the aggregating clusters had the look of assemblages of social insects.

Medical scientists in the bright sunlight of the boardwalk at Atlantic City, swarmed there from everywhere for the annual meetings. Viewed from a suitable height, the aggregating clusters had the look of assemblages of social insects.

Medical scientists swarmed from everywhere for the annual meetings. in the bright sunlight of the boardwalk at Atlantic City, Viewed from a suitable height, the aggregating clusters had the look of assemblages of social insects.

Medical scientists swarmed from everywhere for the annual meetings in the bright sunlight of the boardwalk at Atlantic City. Viewed from a suitable height, the aggregating clusters had the look of assemblages of social insects.

Figure 24:
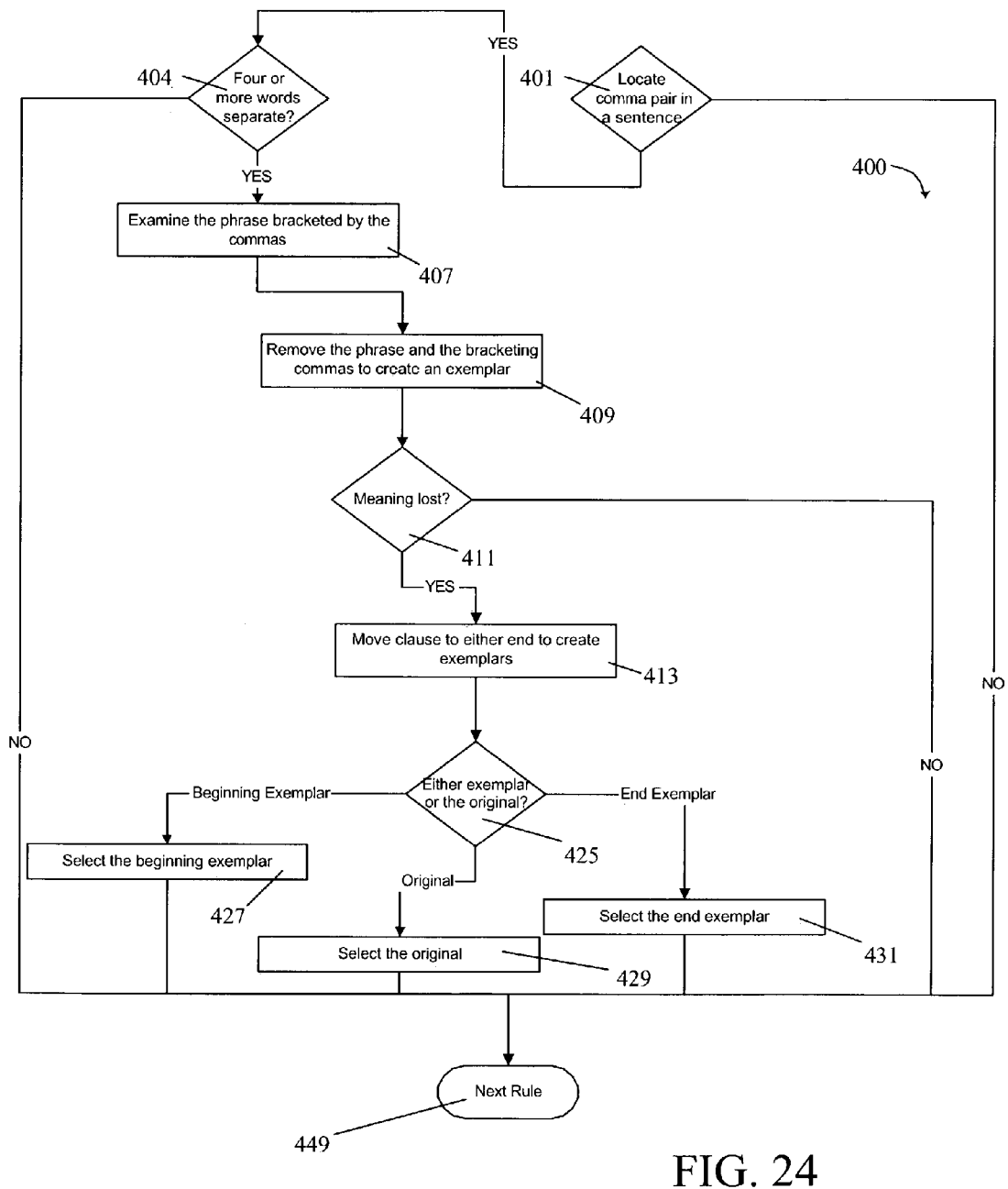
FIGS. 24-27 illustrate processing steps of stage 4 of the process of FIG. 1.

Referring to FIG. 24, a method 400 at a block 401 searches for a sentence containing two or more commas. If the method finds a sentence containing two or more commas at a block 401 the method determines at a block 404 if any two commas are separated by four or more words. If two commas are not separated by four or more words, at a block 404 the method ignores the two commas and proceeds to the next rule at the block 449.

If two commas are separated by four or more words, at a block 404 the method marks the two commas and dims the interrupting words between them. At a block 407 the writer examines the phrase between the commas and at a block 409 removes the dimmed interrupting words. If the sentence retains its meaning, at a block 449 proceeds the next rule. If the sentence does not retain its meaning, at a block 413 the writer moves the interrupting words to the beginning or to the end of the sentence. If the sentence retains its meaning and flows better in the "move to the beginning" exemplar, the writer at a block 427 keeps the interrupting words at the beginning of the sentence, edits accordingly, and proceeds to the next two commas or the next rule at the block 449. If the sentence retains its meaning and flows better in the "move to the end" exemplar, the writer at a block 427 keeps the interrupting words at the end of the sentence, edits accordingly, and proceeds to the next two commas or the next rule at the block 449. Otherwise, the writer retains the original at a block 429 and proceeds to the next rule at the block 449.

Repeated Words

A reader expects to advance with each sentence. If a writer repeats the same point, the reader does not advance, and often the point gets lost in the repetition. A writer should take the reader forward, not backward or sideways. Often a writer can distill the essence of two sentences in one.

- Pursuant to Rule 26(B)(1), Minnesota has adopted a liberal philosophy concerning the scope of discovery. This general philosophy allows for a broad scope of discovery that encompasses any request that "appears reasonably calculated to lead to the discovery of admissible evidence."
- Pursuant to Rule 26(B)(1), Minnesota has adopted a liberal philosophy concerning the scope of discovery. This general philosophy allows for a broad scope of discovery that encompasses any request that "appears reasonably calculated to lead to the discovery of admissible evidence."
- Pursuant to Rule 26(B)(1), Minnesota has adopted a liberal philosophy concerning the scope of discovery that encompasses any request that "appears reasonably calculated to lead to the discovery of admissible evidence."
- Pursuant to Rule 26(B)(1), Minnesota has adopted a liberal philosophy concerning the scope of discovery that encompasses any request that "appears reasonably calculated to lead to the discovery of admissible evidence."
- Pursuant to Rule 26(B)(1), Minnesota has adopted a liberal philosophy that encompasses any request that "appears reasonably calculated to lead to the discovery of admissible evidence."

Figure 25:
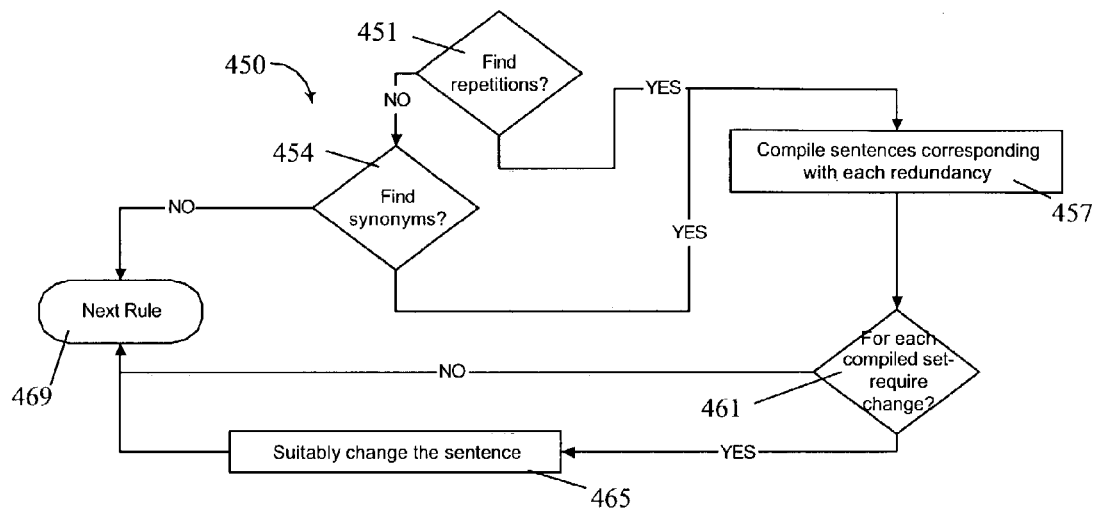

Referring now to FIG. 25, a method 450 at a block 000 searches for nouns and verbs repeated, or their synonyms appearing, within a radius of 250 words. If the method at a block 451 finds a repeated noun or verb or its synonym at a block 454 within the radius, at a block 457 the method marks the original noun or verb and the repeated noun or verb or its synonym and presents the two sentences to the writer.

At a block 461, the writer examines the words around each marked word for ways to combine and eliminate the repetition. This is an important part of the method 450 as there is no regular formulation of a rule against redundancy. For instance, there may be a very technical use of a word that precise describes an object or action, e.g. the difference between "slice" and "cut" may warrant the repeated use of "slice." On the other hand, as a general rule, the repeated use of the word "slice" would be tedious without a technical justification. The writer edits accordingly at a block 465 and proceeds to the next rule at a block 469.

More Than One Negated Verb in a Sentence

The human brain has to work hard to absorb negatives, especially strings of negatives. A reader comprehends the positive much faster. Sometimes a writer must use a negative, but a writer should avoid using more than one negative in a sentence:

- See Owen for a complete analysis of these decisions and the reason in rem jurisdiction does not exist over a res not found within the district.
- See Owen for a complete analysis of these decisions and the reason in rem jurisdiction does not exist over a res not found within the district.
- See Owen for a complete analysis of these decisions and the reason in rem jurisdiction exists only over a res found within the district.

OR

- See Owen for a complete analysis of these decisions and the reason in rem jurisdiction does not exist over a res found outside the district.

Figure 26:
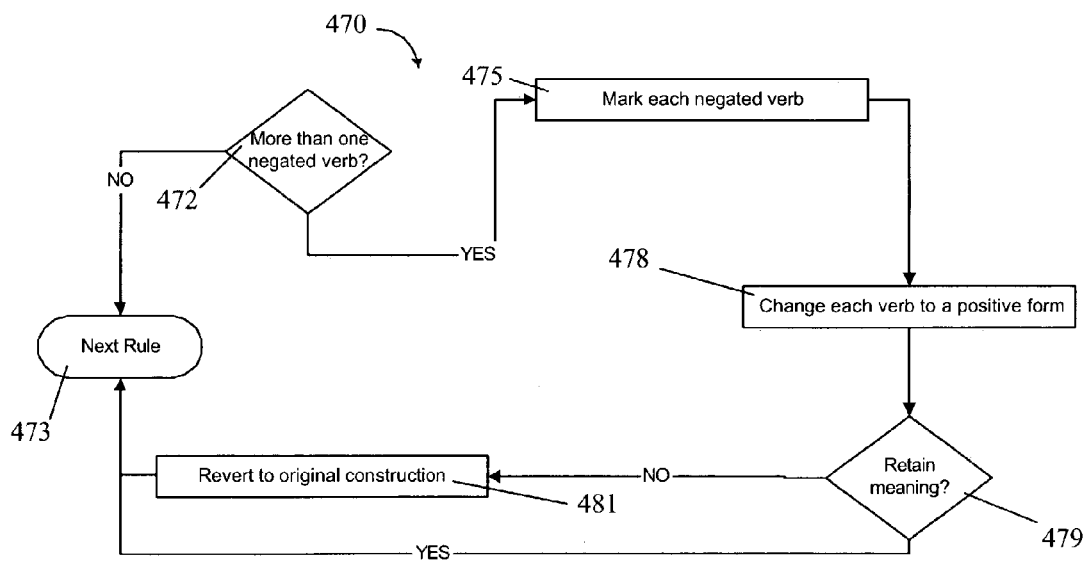

Referring now to FIG. 26. A method 470 at a block 472 searches for a sentence containing two negated verbs. The method marks each negated verb at a block 475. The writer converts both verbs to the positive at a block 478R and edits accordingly. If the sentence retains its meaning, the writer keeps the verbs positive and at a block 473 and proceeds to the next rule. If the sentence does not retain its meaning, the writer negates both verbs again at a block 481 and proceeds to the next rule at a block 473.

ANY

Whenever the word "any" follows a negated verb, the writer can usually improve the sentence by dropping "any," making the verb positive, and negating the object of the verb, usually by putting the word "no" in front of the object. If the "any" is not part of a negative construction, the writer often can still improve the sentence by deleting the "any."

- In winter a deciduous tree doesn't have any leaves.
- In winter a deciduous tree doesn't have any leaves.
- In winter a deciduous tree has no leaves.

Figure 27:
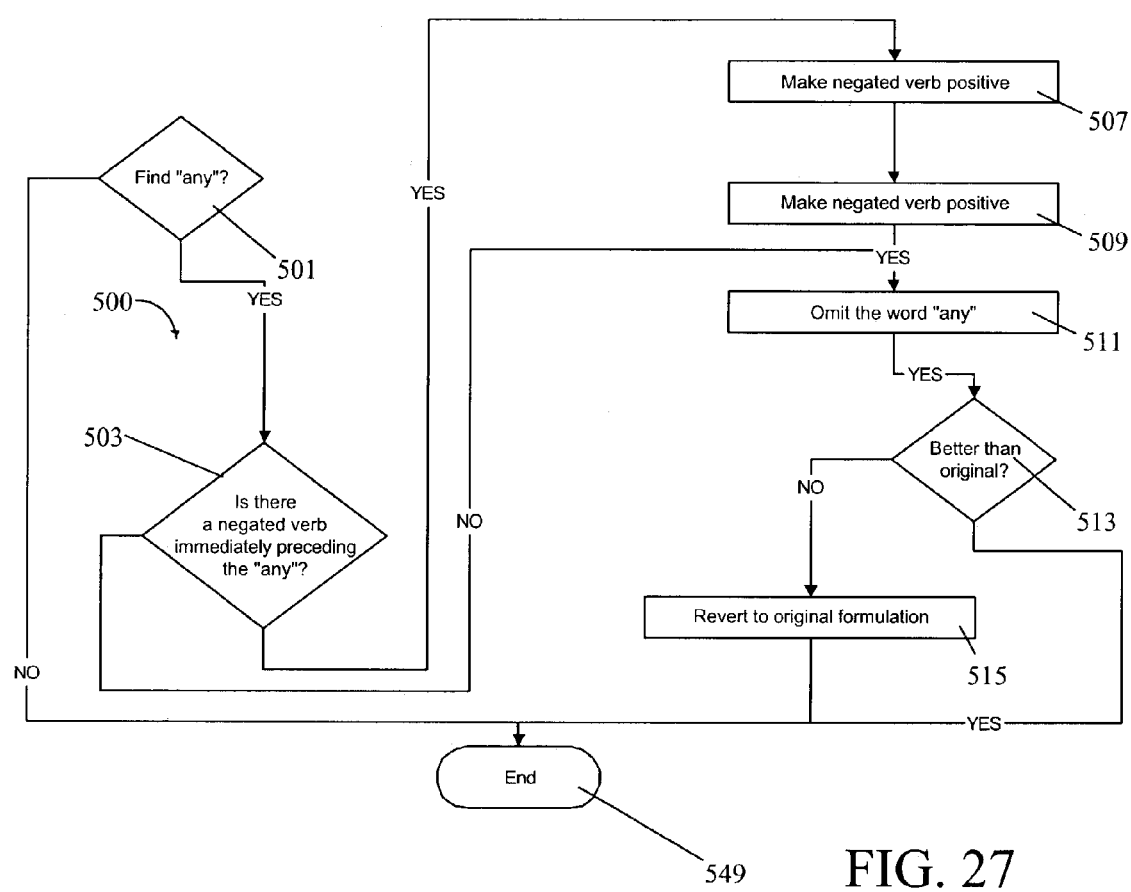

Become:

- If you have any questions, don't hesitate to call or email.
- If you have any questions, don't hesitate to call or email.
- If you have questions, don't hesitate to call or email Referring to FIG. 27, a method 500 at a block 501 searches for the word "any." If the "any" follows a negated verb, the writer makes the negated verb positive at a block 507, negates the object of the verb at a block 509, and deletes the "any" at a block 511. At a block 513, the writer selects the preferred version, either the original or the edited version and proceeds to the next rule at a block 549.

If the "any" does not follow a negated verb at block 503, the writer removes the "any" at a block 511. If the sentence retains its meaning, the writer deletes the "any" at a block 513 and proceeds to the next rule. If the sentence does not retain its meaning, the writer keeps the "any" at a block 515 and proceeds to the next rule at a block 549.

That is the final step of the four stages.

Applying The Invention To The Examples Above

In the Background section, the Microsoft Word® grammar checker examined this sentence:

There's really no choice in the matter.

. . . and got rid of the contraction:

There is really no choice in the matter.

But the problems have nothing to do with contractions. The invention would have alerted the writer to the "There," (the "is,") the "in," and the ".". The writer then would have deleted "There's" and "in the matter," and ended up with:

You have no choice.

Depending on the context, the writer might substitute another pronoun for "You." The writer could even include the word "really"; that's for the writer to decide. But the writer should delete "in the matter" and "There's."

Applying the invention to the sentences written by the senior, the lawyer, the Harvard editors, and the Stanford dean as presented in the Background section:

First the senior:

It was during this time that many citizens, particularly students, came to the realization that Sun Yat-sen's three principles of the people had not yet been accomplished through the bloody hardships of war.

The senior directs the method to begin Stage One (Referring to FIGS. 1 through 27).

Stage One:

The method searches the sentence at the block 103 for the word "it." The method marks the "It" at the block 105 and asks the writer, "Is this a pronoun?" At the block 105 the writer responds "no." The method at block 107 then tries to match the "It" and the few words following to any entry on a list 70 of known unnecessary phrases or weak constructions beginning with "it." At block 108 the opening construction "It was _____ that" matches an entry on the list 70 of "Typically Unnecessary Phrases and Weak Constructions Beginning with 'It.'" FIG. 2. The method at block 121 dims the three words so the writer can read the other words and see that the dimmed words are unnecessary.

At FIG. 12, the block 231, the method 230 searches for the word "that." At the block 231 the method finds a "that" and dims the word. At the block 237 the senior decides whether to keep the "that." For syntax and clarity, the senior will probably keep it.

Figure 8:
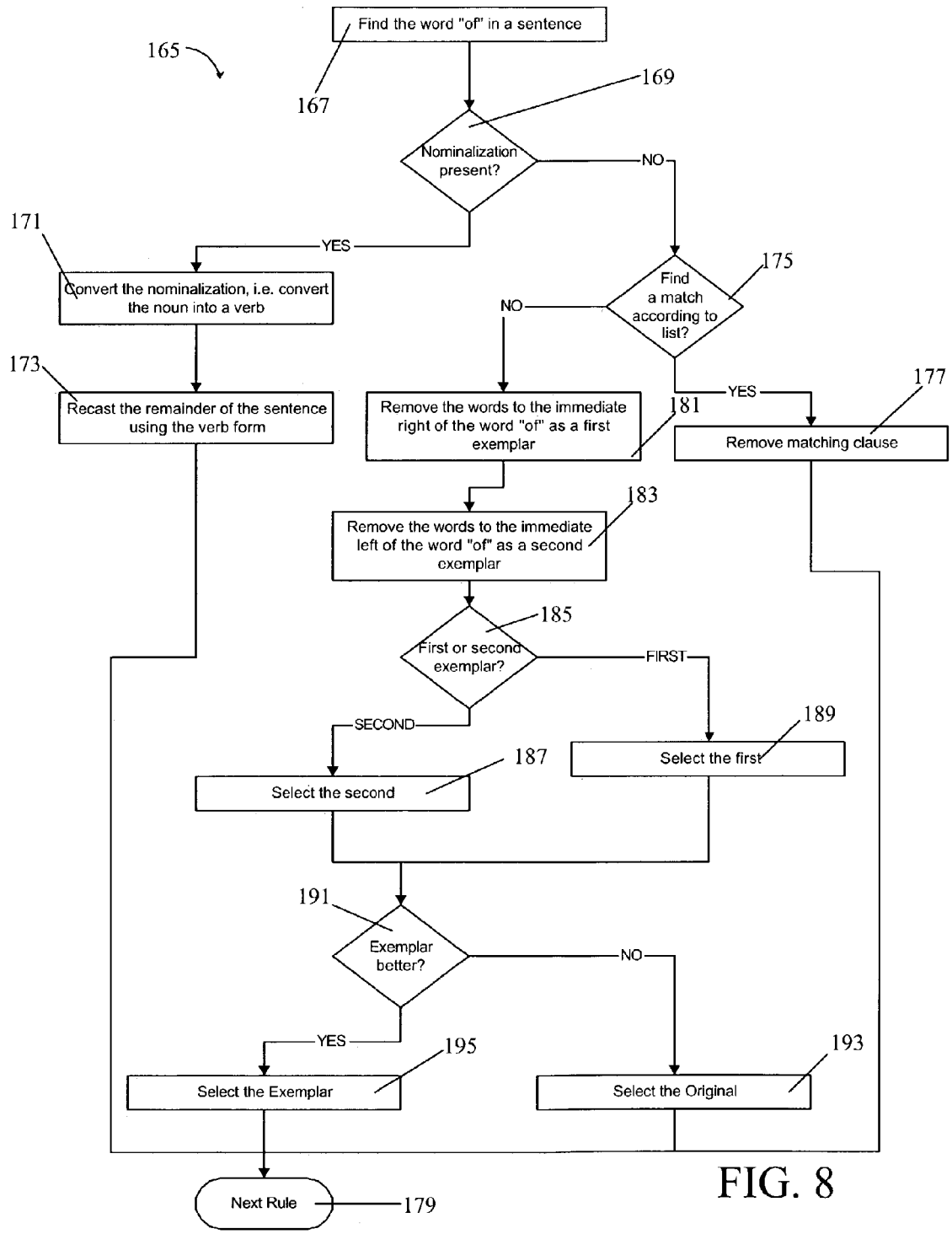
FIG. 8 illustrates stage 1 processing steps associated with "of."

At FIG. 8, the method at the block 167 searches for the word "of." The method at the block 167 finds two "of"s and marks them. At the first "of," block 183, the senior mentally removes "three principles of," then mentally removes "of the people." Deleting either would alter the meaning of the sentence. At the block 195, the senior decides to keep the first "of" and the words around it. Still in block 185, at the second "of," the senior mentally removes "the bloody hardships of," then mentally removes "of war." Although the senior might delete "the bloody hardships of," (and end with "had not yet been accomplished through war." or "had not yet been accomplished."), at the block 193 she decides to keep the phrase. Still at the block 193, she also keeps "of war."

Referring to FIG. 13, the method 250 searches for a period at the block 251. The method finds a period and marks it. The method then searches the previous eight words at the block 255 for a match to any entry on the list of "Common Prepositions" (excluding "in" and "of"), 273 FIG. 14. At the block 255 the method finds a match with the word "through" and dims the word. Because the writer has already examined the words around the "of" at the block 253 and those words complete the prepositional phrase beginning with "through," at the block 268 the writer ignores the sign "through."

Referring to FIG. 11, the method 220 at the block 223 searches for phrases that match any entry on a list of "Clichés" and a list of "Redundancies" found in FIG. 16 at 275 and 276, and words that match any entry on a list of "Typically Unnecessary Words" found in the list 274 FIG. 15. At the block 223, the method finds one match, the word "yet." The method dims "yet" at the block 225, and the writer at the block 000 decides to delete the word.

Referring to FIG. 11, the method 220 at the block 223 searches for phrases that match any entry on a list of "Phrases that Typically Should Be Shorter," found in the lists 277 and 278 in FIG. 17. At the block 223, the method finds no matches. Finally, referring to FIG. 17, the method 220 at the block 223 searches for word pairs in which the first word is typically unnecessary. At the block 223, the method finds no matches.

Stage One:

It was during this time that many citizens, particularly students, came to the realization that Sun Yat-sen's three principles of the people had not yet been accomplished through the bloody hardships of war{.}

_____ during this time _____ many citizens, particularly students, came to the realization that Sun Yat-sen's three principles of the people had not yet been accomplished through the bloody hardships of war{.}

_____ during this time _____ many citizens, particularly students, came to the realization that Sun Yat-sen's three principles of the people had not yet been accomplished through the bloody hardships of war{.}

_____ during this time _____ many citizens, particularly students, came to the realization that Sun Yat-sen 's three principles of the people had not yet been accomplished through the bloody hardships of war{.}

_____ during this time _____ many citizens, particularly students, came to the realization that Sun Yat-sen's three principles of the people had not been accomplished through the bloody hardships of war{.}

_____ during this time many citizens, particularly students, came to the realization that Sun Yat-sen's three principles of the people had not been accomplished through the bloody hardships of war.

The senior directs the method to begin Stage Two.

Stage Two:

Referring now to FIG. 22, at the block 354 the method searches for a word ending in "ion." At the block 354 the method finds a word ending in "ion"—"realization." The method at the block 356 tries to match the word to a list 348 FIG. 19 of words that end in "ion" but have no verb form, so cannot become a verb. At the block 356 the method finds no match. The method at the block 358 then tries to match the word to a list 347 FIG. 19 of words ending in "ion" that are already verbs. At the block 358 the method finds no match. The method at the block 361 then tries to match the word and the phrase containing the word to a list 350 FIG. 20 of known "Phrases Containing Nominalizations that End in 'ion.'" At the block 361, the phrase "came to the realization" matches an entry on the list 350 FIG. 20. The method at the block 363 dims the phrase "came to the realization" and places the verb "realized" immediately after "realization." The senior may reject the change, but at the block 363 probably will accept it.

Referring to FIG. 8, the method 165 at the block 167 searches for the word "of" again. At the block 375 the method finds and marks the first "of." The method at the block 175 tries to match the immediately preceding word, "principles," to any entry on both lists of nominalizations, Phrases Containing Nominalizations that End in 'ion,'" FIG. 8, and Phrases Containing Nominalizations that Do Not End in 'ion,'" 349 FIG. 19. At the block 175 the method finds no match. In the Stage One at the block 185 the senior already examined the words around the "of" for unnecessary words and found none. Now at the block 189 the senior examines the word immediately preceding the "of" to determine if it is a nominalization. At the block 191 she determines it is not and keeps the word.

Referring to FIG. 18, the method 300 at the block 303 searches for any of the "to be" verbs, "am," "is," "was," "were," are, "been," and "be." At the block 305 the method finds the word "been." The method at the block 305 dims "been" and marks the two following words, "accomplished" and "through." The writer determines at the block 307 that "accomplished" is a "strong" verb. At the block 309 the writer now searches the words preceding the "to be" verb for an object to the "strong" verb, "accomplished." The writer at the block 309 finds "Sun Yat-sen's three principles of the people," confirming that the verb is passive. The senior decides at the block 311 that she has no reason to keep the verb passive. She needs an actor. At the block 313 she searches for an actor among the words following the "strong" verb and at the block 000 finds "the bloody hardships of war." At the block 315 she now deletes the "to be" verb "been," moves the object to a position after the "strong" verb, and moves the actor to a position in front of the strong verb. Last, at the block 315, she deletes "through."

Referring to FIG. 22, the method 352 at the block 375 marks the second "of" again. The method at the block 361 tries to match the immediately preceding word, "hardships," to any entry on both lists of nominalizations, Phrases Containing Nominalizations that End in 'ion,'" 350 FIG. 20, and Phrases Containing Nominalizations that Do Not End in 'ion,'" 349 FIG. 19. At the block 361 the method finds no match. At the block 371 she determines it is not and keeps the word.

Stage Two:

_____ during this time many citizens, particularly students, came to the realization realized that Sun Yat-sen's three principles of the people had not been accomplished through the bloody hardships of war.

_____ during this time many citizens, particularly students, _____ realized that Sun Yat-sen's three principles of the people had not been accomplished through the bloody hardships of war.

_____ during this time many citizens, particularly students, _____ realized that Sun Yat-sen's three principles of the people had not been accomplished through the bloody hardships of war.

_____ during this time many citizens, particularly students, _____ realized that _____ the bloody hardships of war _____ had not accomplished through _____ Sun Yat-sen's three principles of the people.

_____ during this time many citizens, particularly students, _____ realized that the bloody hardships of war had not accomplished Sun Yat-sen's three principles of the people.

_____ during this time many citizens, particularly students, _____ realized that the bloody hardships of war had not accomplished Sun Yat-sen's three principles of the people.

The senior directs the method to begin Stage Three.

Stage Three:

Referring to FIG. 23, the method 250 at the block 255 searches for a match to any entry on a list 273 FIG. 14 of "Prepositions" (excluding "in" and "of"). At the block 255 the method finds no match.

The senior directs the method to begin Stage Four.

Stage Four:

Referring to FIG. 24, the method 400 at the block 401 searches for pairs of commas. At the block 401 the method finds no pairs of commas.

Referring to FIG. 25, the method 450 at the blocks 451, 454 searches for the same or synonymous words appearing more than once within a radius of 250 words. The radius exceeds the number of words in the example, but at the block 469 the method finds no repeated words or synonyms in the example.

Referring to FIG. 26, the method 470 at the block 472 searches for more than one negated verb with the sentence. At the block 472 the method finds no negated verbs.

Referring to FIG. 27, the method 500 at the block 501 searches for the word "any." At the block 501 the method finds no "any." The final sentence:

During this time many citizens, particularly students, realized that the bloody hardships of war had not accomplished Sun Yat-sen's three principles of the people.

The writer proceeds to the next directed sampling.

The invention directs the writer quickly to the areas where problems have a high probability of existing, but allows the writer to decide if a problem exists. Then it takes the writer to the next high probability area.

In Stage One, the invention leads the lawyer to examine six signs:

It should be noted that an oral notice of intent to renew, where written notice is required under the terms of the lease, is sufficient to constitute an effective exercise of the option{.}

The "It" at the beginning, with the "that" following, signals that the opening of the sentence can either be deleted or significantly reduced according to the method 100 FIG. 3.

_____ an oral notice of intent to renew, where written notice is required under the terms of the lease, is sufficient to constitute an effective exercise of the option{.}

According to the method 165, shown in FIG. 8, the lawyer examines the first "of," but here the phrase "oral notice of intent to renew" is an old legal term of art and should probably remain intact. That is the lawyer's choice.

_____ an oral notice of intent to renew, where written notice is required under the terms of the lease, is sufficient to constitute an effective exercise of the option{.}

The second "of" again signals potentially unnecessary words under the method 165 in FIG. 8. Here, the lawyer removes "the terms of," because the terms form the lease, and the lease contains the terms. "The terms of the lease" is repetitive.

_____ an oral notice of intent to renew, where written notice is required under _____ the lease, is sufficient to constitute an effective exercise of the option{.}

The third "of" marked by the method 165 has no unnecessary words around it, so the lawyer leaves it alone for now. The end of the sentence is fine.

_____ an oral notice of intent to renew, where written notice is required under _____ the lease, is sufficient to constitute an effective exercise of the option.

In Stage Two, the invention marks the following signs:

_____ an oral notice of intent to renew, where written notice is required under _____ the lease, is sufficient to constitute an effective exercise of the option.

The first "is" signals passive voice according to the method 300 shown in FIG. 18, with a strong verb ("required") following immediately behind it and the object ("written notice") preceding it. The actor is "the lease." The lawyer makes the verb active by deleting the "is," placing the object ("written notice") after "required," and placing the actor ("the lease") before "required," as the method 300 indicates at the block 315. The lawyer finishes the editing by changing "required" to "requires" and deleting "under" to fit the new sentence order.

_____ an oral notice of intent to renew, where the lease requires written notice, _____ is sufficient to constitute an effective exercise of the option.

The remaining "is" and the remaining "of" each point to a nominalization according to the method 352 at the blocks 354 and 375. The verb "exercises" is more forceful. When the lawyer converts the nominalization "is an effective exercise of" into its verb form, as in block 365, "sufficient to constitute" automatically comes out. Although "option" is a nominalization indicated by the last sign "ion," the lawyer would choose to keep it.

_____ an oral notice of intent to renew, where the lease requires written notice, _____ exercises _____ the option.

In Stage Three, no prepositions remain to mark under the method 250, so the lawyer proceeds to Stage Four, where the invention, according to the method 400 at the block 401, marks the following sign and the words between:

_____ an oral notice of intent to renew{,} where the lease requires written notice{,} _____ exercises _____ the option.

Six words separate the two commas, so the lawyer considers the five options at method 400 to make the sentence smoother and carry the reader forward: deleting the clause under block 409, which would change the meaning, so doesn't work; editing the clause at beginning and end to make it fit at the block 413, which also doesn't work; making the clause into another sentence at the block 425, which because of its length is unnecessary; and moving the clause either to the beginning or the end of the sentence, either of which would work for the lawyer.

_____ where the lease requires written notice, an oral notice of intent to renew _____ _____ exercises _____ the option.

With the unnecessary words now deleted, the passive voice and nominalization converted, and the sentence rearranged to move forward, the lawyer would see that the original sentence needed a word to contrast the two clauses, which the lawyer now places at the beginning of the sentence: "Even."

Even where the lease requires written notice, an oral notice of intent to renew exercises the option.

Under the invention, the lawyer may choose different words and different order. After deleting the unnecessary words, converting the passive voice and the nominalization, and rearranging the sentence, the lawyer may decide that the context already establishes that the sentence refers to an "option," and so end the sentence like this:

Even where the lease requires written notice, an oral notice of intent to renew is sufficient.

Even where the lease requires written notice, an oral notice of intent to renew suffices.

Even where the lease requires written notice, an oral notice of intent to renew is effective.

Or the lawyer will prefer to shift words from one clause to the other:

Even where the lease requires written notice of intent to renew, an oral notice exercises the option.

Some lawyers don't like the word "where" unless it denotes physical location; so the lawyer could begin, "Even if the lease requires . . . ."

The lawyer may even choose to reverse the order of the two clauses:

An oral notice of intent to renew exercises the option, even where the lease requires written notice.

The invention provides the structure for ridding all writing of what is unnecessary, dull, and confusing, without affecting the writer's voice. Once a writer has quickly addressed each sign, remaining problems become easier to see, and the writer may have several ways to create the final expression.

In Stage One and Stage Two, the invention suggests to the editors of the Harvard Management Communication Letter that they consider tightening their sentence at these points:

The writer wants to ask a question about whether or not investors will learn from the crash in prices{.}

"To ask a question" is a nominalization that the editors should convert back to a verb as in block 171 (FIG. 8). Doing that forces the word "about" out of the sentence:

The writer wants to _____ question _____ whether or not investors will learn from the crash in prices{.}

Next the editors look at the "or" as in block 221 (FIG. 11) and the word or two that follow. "Or not" is unnecessary and removed at the block 223:

The writer wants to _____ question _____ whether _____ investors will learn from the crash in prices{.}

"From" will remain, but the "in" (block 255, FIG. 13) and the period (block 251, FIG. 13) both signal a short prepositional phrase the editors can delete because it over explains:

The writer wants to _____ question _____ whether _____ investors will learn from the crash _____.

The editors' final sentence:

The writer wants to question whether investors will learn from the crash.

The sentence written by the Stanford dean produces signs at all four stages. The invention suggests to her that she look closer at these words and punctuation:

Although it has been argued that emphasizing the Achievement Tests in admissions, rather than SATs{,} would improve the quality of American secondary school education and consequently better prepare students for college{,} it is also true that requiring such tests could unfairly penalize disadvantaged students in the college admissions process{.}

The "it" followed by "that" means that the dean can improve the opening by condensing or deleting those words (block 112, FIG. 3). (If she decides to delete those words, she probably should change the "would" to "might" to preserve the meaning.) The word "been" (block 303, FIG. 18) also has the dean look for passive voice: Immediately to the right is the strong verb "argued" and to the left is the object "it." It is passive voice (block 309, FIG. 18), and the dean has two choices: make it active (block 315, FIG. 18), or remove those words and change "would" to "might":

Although _____ emphasizing the Achievement Tests in admissions, rather than SATs{,} might improve the quality of American secondary school education and consequently better prepare students for college{,} it is also true that requiring such tests could unfairly penalize disadvantaged students in the college admissions process{.} or:

Although _____ (some argue that) _____ emphasizing the Achievement Tests in admissions, rather than SATs{,} would improve the quality of American secondary school education and consequently better prepare students for college{,} it is also true that requiring such tests could unfairly penalize disadvantaged students in the college admissions process{.}

The word "in" signals the probability of deleting it and "admission" (block 262, FIG. 23). This sentence appears in a book about "admissions," so that is already understood. The method will ignore this "ion" word, because the whole prepositional phrase comes out.

Although _____ emphasizing the Achievement Tests _____, rather than SATs{,} might improve the quality of American secondary school education and consequently better prepare students for college{,} it is also true that requiring such tests could unfairly penalize disadvantaged students in the college admissions process{.}

When the dean sees the "of," she knows to look to the left and to the right for unnecessary words (blocks 185, 181-183, FIG. 8). She may decide to keep "the quality of," but the sentence says the same thing without it (block 167, FIG. 3):

> Although _____ emphasizing the Achievement Tests _____, rather than SATs{,} might improve _____ American secondary school education and consequently better prepare students for college{,} it is also true that requiring such tests could unfairly penalize disadvantaged students in the college admissions process{.}

"Education" is a nominalization, but other words modify it, so the dean will probably choose to leave it alone. However, she could decide to convert it to a verb and change that part of the sentence to "would improve the way we educate our high school students and consequently better prepare them for college." (That would add four words, but make the sentence livelier. She has the choice.) Next is another "it" (followed by another "that") at the beginning of a clause. The dean can rewrite the opening to that clause. The word "is" (block 203, FIG. 5) signifies the possibility of passive voice, but no strong verb stands to the right.

> Although _____ emphasizing the Achievement Tests _____, rather than SATs{,} might improve _____ American secondary school education and consequently better prepare students for college{,} _____ requiring such tests could unfairly penalize disadvantaged students in the college admissions process{.}

Last, the remaining "in" and the period direct the dean to more words she can remove. Again, the book is about "college admissions," so putting the words here over explains.

> Although _____ emphasizing the Achievement Tests _____, rather than SATs{,} might improve _____ American secondary school education and consequently better prepare students for college{,} _____ requiring such tests could unfairly penalize disadvantaged students _____.

The dean ends up with a sentence something like this:

Although emphasizing the Achievement Tests, rather than SATs{,} might improve American secondary school education and consequently better prepare students for college{,} requiring such tests could unfairly penalize disadvantaged students.

Seeing the movement of words set in motion by the invention, and the two commas separated by more than three words, the dean may now prefer to break this into two sentences that express her original thought much more powerfully and succinctly:

> Emphasizing the Achievement Tests, rather than SATs, might improve American secondary school education and consequently better prepare students for college. But requiring such tests could unfairly penalize disadvantaged students.

The invention also detects many opportunities to improve the sentences from the three reference books:

First, Fowler's explanation of "reduplicated" words:

> Most of us find an engaging quality in these words{.} Perhaps that is because it is through them that we enter the world of speech.

The first two signs, "of" and "in," indicate nothing wrong. The editors examine them quickly, decide they can remove nothing, and go to the end of the sentence, which also is fine. In the next sentence, "that" presents no problem. The first "is" indicates neither passive voice nor a nominalization; the editors leave it alone. But the editors can remove "it is" followed by "that," as it matches an entry on the list 70 at FIG. 2 according to method 100. The last "of" remains.

> Most of us find an engaging quality in these words. Perhaps that is because _____ through them _____ we enter the world of speech.

Resulting in:

> Most of us find an engaging quality in these words. Perhaps that is because through them we enter the world of speech.

Next, the Chicago Manual of Style's elaboration on the American preference for placing punctuation inside quotation marks:

> In defense of nearly a century and a half of the American style, however, it may be said that it seems to have been working fairly well and has not resulted in serious miscommunication{.}

Here, several signs work together. First, the editors see the "in" and the "of" and delete "In defense of."

> _____ nearly a century and a half of the American style, however, it may be said that it seems to have been working fairly well and has not resulted in serious miscommunication{.}

Next, the editors see the "of" and remove "of the American style."

> _____ nearly a century and a half _____, however, it may be said that it seems to have been working fairly well and has not resulted in serious miscommunication{.}

Then they delete the unnecessary words from "it" through "that":

> _____ nearly a century and a half _____, however, _____ it seems to have been working fairly well and has not resulted in serious miscommunication{.}

The remaining "it" is a pronoun for "the American style," so the editors replace it now with the noun.

> _____ nearly a century and a half _____, however, _____ the American style seems to have been working fairly well and has not resulted in serious miscommunication{.}

"Been" indicates neither passive voice nor a nominalization, but a third possible problem exists: The sentence is weak at that juncture. The editors can remove "been" and change "working" to "worked."

> _____ nearly a century and a half _____, however, _____ the American style seems to have _____ worked fairly well and has not resulted in serious miscommunication{.}

"In" is not a problem, and the "ion" reveals a nominalization that should remain; but questioning the end of the sentence, the editors could decide that "and has not resulted in serious miscommunication" repeats "seems to have worked fairly well." It is over explaining. They may choose either clause.

> _____ nearly a century and a half _____, however, _____ the American style seems to have _____ worked fairly well _____.

Or:

> _____ nearly a century and a half _____, however, _____ _____ the American style _____ _____ has not resulted in serious miscommunication.

For either version, the editors would now add the word "For" at the beginning:

> For nearly a century and a half, however, the American style seems to have worked fairly well.

Or:

> For nearly a century and a half, however, the American style has not resulted in serious miscommunication.

The editors may find a more succinct way to express "has not resulted in," e.g., "has avoided," but that is up to them. Last, the Oxford English Dictionary's definition of "redundancy":

> The incorporation of extra parts in the design of a mechanical or electronic system in such a way that its function is not impaired in the event of a failure{.}

The "ion" suffix and the word "of" signal a nominalization. The cleaner way to express this is to use the gerund form of the verb, "incorporating."

> Incorporating _____ extra parts in the design of a mechanical or electronic system in such a way that its function is not impaired in the event of a failure{.}

"In" is not a problem this time, but the "of" tells the editors they can probably get rid of a few words here and still say the same thing.

> Incorporating _____ extra parts in _____ a mechanical or electronic system in such a way that its function is not impaired in the event of a failure{.}

What follows the "or" should remain in the sentence, because it does not repeat what precedes the "or"; but the second "in" directs the editors to more unnecessary words: "in such a way" becomes "so." The editors might keep the word "that," but it can come out > Incorporating _____ extra parts in _____ a mechanical or electronic system so _____ its function is not impaired in the event of a failure{.}

The word "function" is a nominalization and a verb, but can remain in its noun form if the editors chose. That choice depends on what they do with the remaining problems. The "is" reveals passive voice, with the strong verb two words to the right ("impaired") and the object to the left ("function"). However, before they try to make it active, the editors should deal with the remaining signs. "In the event" becomes "if." The word "failure" is a nominalization, but the invention will not detect it. However, when the editors remove "in the event" and replace it with "if," "failure" may become the verb "fails." It also may remain "failure." The signs not only reveal discrete editing problems, they often interact or lead to solving problems with no signs.

> Incorporating _____ extra parts in _____ a mechanical or electronic system so _____ its function is not impaired if a failure occurs.
> Incorporating extra parts in a mechanical or electronic system so its function is not impaired if a failure occurs.

Or:

> Incorporating _____ extra parts in _____ a mechanical or electronic system so _____ its function is not impaired if one part fails.
> Incorporating extra parts in a mechanical or electronic system so its function is not impaired if one part fails.

Although both possibilities remain in the passive voice, they work well, so the editors may choose to keep them passive. Both possibilities also work well if the editors decide to make them active.

> Incorporating extra parts in a mechanical or electronic system so its function is not impaired if one part fails.
> Incorporating extra parts in a mechanical or electronic system so if one part fails, the failure will not impair its function.

Or:

> Incorporating extra parts in a mechanical or electronic system so its function is not impaired if a failure occurs.
> Incorporating extra parts in a mechanical or electronic system so a failure will not impair its function.

Another possibility the editors might choose:

> Incorporating extra parts in a mechanical or electronic system so if one part fails, the system will continue to function.

The writer can use the signs in any order to spot potential problems. Sometimes there are no problems; sometimes two signs indicate the same problem; sometimes two signs point out related problems; sometimes dealing with one sign negates another. Often by dealing with the signs, and correcting the problems revealed, a writer begins to see other problems that have no signs but that the writer would not have noticed without the movement of words created by using the signs.

Some of the densest writing in the English language comes from lawyers, not because their writing has to be that way, but because no one has ever taught lawyers how to express themselves without crowding more words than necessary into a sentence. Here's an example from a federal judge, who was graduated from Yale University and Harvard Law School. This is the opening paragraph of a manuscript he has written on reforming the judicial system. He labored a long while to get the paragraph this tight:

> It is no secret that, from the standpoint of client interests, modern litigation is an outright disaster. The costs of adversary litigation have become so disproportionate to the benefits that a trial of the merits of a lawsuit provides virtually no possibility of justice. The verdict comes too late, and the expense is too high. In practice, litigation is capable of producing justice only by agreement, and only when the agreement is reached early in the case. For this to become the norm, however, rather than the rare exception, will require basic changes in attitude on the part of everyone involved in the system.

Microsoft Word® finds the passage perfect. It notes that the passage comprises one paragraph, five sentences, 104 words, and 517 characters; that it averages five sentences per paragraph, 20.8 words per sentence, and 4.8 characters per word. Next, Word® assesses the passage's "readability"; it reveals the percentage of passive sentences as 20, and rates the passage, according to the "Flesch Reading Ease" at 45.8, and according to the "Flesch-Kincaid Grade Level" at 12.0. Word® says nothing else about the passage.

When the judge is ready to edit his manuscript, he directs the invention to begin Stage One on the first paragraph. The invention searches for "it," "there," "in," "of," ".," "as," "or," and "that.," plus matches to any entry on the lists: unnecessary phrases that contain "it," "there," "in," "of," "as," or "or"; clichés, redundancies, weak construction, unnecessary words, and pairings in which the first word is unnecessary. The invention marks the following words:

> It is no secret that, from the standpoint of client interests, modern litigation is an outright disaster{.} The costs of adversary litigation have become so disproportionate to the benefits that a trial of the merits of a lawsuit provides virtually no possibility of justice{.} The verdict comes too late, and the expense is too high{.} In practice, litigation is capable of producing justice only by agreement, and only when the agreement is reached early in the case{.} For this to become the norm, however, rather than the rare exception, will require basic changes in attitude on the part of everyone involved in the system{.}

The judge then examines each marked word and the words around them and determines that some should stay, but that the sentences would retain their meaning if he deleted others:

It is no secret that, from the standpoint of client interests, modern litigation is an outright disaster{.} The costs of adversary litigation have become so disproportionate to the benefits that a trial of the merits of a lawsuit provides virtually no possibility of justice{.} The verdict comes too late, and the expense is too high{.} In practice, litigation is capable of producing justice only by agreement, and only when the agreement is reached early in the case{.} For this to become the norm, however, rather than the rare exception, will require basic changes in attitude on the part of everyone involved in the system{.}

The judge deletes or replaces the words with no meaning. If the judge changes nothing around a marked sign, the invention now ceases to mark that sign.

_____, from _____ client interests, modern litigation is a _____ disaster. The costs _____ have become so disproportionate to the benefits that a trial _____ _____ provides virtually no possibility of justice. The verdict comes too late, and the expense is too high. _____ litigation is capable of producing justice only by agreement, and only when the agreement is reached early _____. For this to become the norm, however, rather than the rare exception, will require _____ changes from _____ everyone involved _____.

With the paragraph less cluttered, the judge instructs the invention to begin Stage Two. The invention searches for "am," "is," "was," "were," "are," "been," "be," the suffix "ion," and "of" (again):

_____, from _____ client interests, modern litigation is a _____ disaster. The costs _____ have become so disproportionate to the benefits that a trial _____ _____ provides virtually no possibility of justice. The verdict comes too late, and the expense is too high. _____ litigation is capable of producing justice only by agreement, and only when the agreement is reached early _____. For this to become the norm, however, rather than the rare exception, will require _____ changes from _____ everyone involved _____.

Using the marked words to guide him, the judge tests each sign for passive voice, nominalizations, and weak construction:

_____, from _____ client interests, modern litigation is a _____ disaster. The costs _____ have become so disproportionate to the benefits that a trial _____ _____ provides virtually no possibility of justice. The verdict comes too late, and the expense is too high. _____ litigation is capable of producing justice only by agreement, and only when the agreement is reached early _____. For this to become the norm, however, rather than the rare exception, will require _____ changes from _____ everyone involved _____.

The judge tightens the weak wording and converts one passive voice to active. If the judge changes nothing around a marked sign, the invention now ceases to mark that sign:

_____, from _____ client interests, modern litigation is a _____ disaster. The costs _____ have become so disproportionate to the benefits that a trial _____ _____ provides virtually no possibility of justice. The verdict comes too late, and the expense is too high. _____ litigation _____ produces justice only by agreement, and only when the parties agree _____ _____ early _____. For this to become the norm, however, rather than the rare exception, will require _____ changes from _____ everyone involved _____.

The judge now directs the invention to begin Stage Three, in which the invention searches for all remaining prepositions (excluding "of" and "in").

_____, from _____ client interests, modern litigation is a _____ disaster. The costs _____ have become so disproportionate to the benefits that a trial _____ _____ provides virtually no possibility of justice. The verdict comes too late, and the expense is too high. _____ litigation _____ produces justice only by agreement, and only when the parties agree _____ _____ early _____. For this to become the norm, however, rather than the rare exception, will require _____ changes from _____ everyone involved _____.

With these words marked, the judge decides if he can delete any of the prepositional phrases begun by the marked words. Two are unnecessary, the first and the last. The judge deletes both, and the invention ceases to mark the other prepositions:

_____ modern litigation is a _____ disaster. The costs _____ have become so disproportionate to the benefits that a trial _____ _____ provides virtually no possibility of justice. The verdict comes too late, and the expense is too high. _____ litigation _____ produces justice only by agreement, and only when the parties agree _____ _____ early _____. For this to become the norm, however, rather than the rare exception, will require _____ changes _____ _____.

In the final stage, Stage Four, the judge instructs the invention to mark pairs of commas separated by more than three words, the same or similar substantive words appearing more than once, two negated verbs in the same sentence, and the word "any" following a negated verb.

_____ modern litigation is a _____ disaster. The costs _____ have become so disproportionate to the benefits that a trial _____ _____ provides virtually no possibility of justice. The verdict comes too late, and the expense is too high. _____ litigation _____ produces justice only by agreement, and only when the parties agree _____ _____ early _____. For this to become the norm, however{,} rather than the rare exception{,} will require _____ changes _____ _____.

The judge examines the words between the two commas and determines they form a clause that over explains the preceding clause. The judge deletes them:

_____ modern litigation is a _____ disaster. The costs _____ have become so disproportionate to the benefits that a trial _____ _____ provides virtually no possibility of justice. The verdict comes too late, and the expense is too high. _____ litigation _____ produces justice only by agreement, and only when the parties agree _____ _____ early _____. For this to become the norm, however,_____ _____ _____ will require _____ changes _____ _____.

With those words deleted, the judge has edited the paragraph tightly.

_____, modern litigation is a _____ disaster. The costs _____ have become so disproportionate to the benefits that a trial _____ _____ provides virtually no possibility of justice. The verdict comes too late, and the expense is too high. _____ litigation _____ (produces) justice only by agreement, and only when the (parties agree) early _____. For this to become the norm, however, _____ _____ will require _____ changes _____ _____ _____.

Recasting the sentence results in:

Modern litigation is a disaster. The costs have become so disproportionate to the benefits that a trial provides virtually no possibility of justice. The verdict comes too late, and the expense is too high. Litigation produces justice only by agreement, and only when the parties agree early. For this to become the norm, however, will require changes.

Removing unnecessary words allows the judge to see other ways to improve the paragraph. Although no signs remain that the judge has not examined, when he edits the paragraph this far, he may choose to replace words or rearrange sentences. For example, he could improve the ending by writing, "will require new ways of thinking," or "will require a new approach to justice." Instead of leaving the end of the fourth sentence, "and only when the parties agree early," he could write, "and only when agreement comes early." For slightly more eloquence and better syntax, he could reverse the order of that sentence to end up with, "Only by agreement can litigation produce justice, and only when agreement comes early." After the invention has gotten him this far, the judge's natural writing style will dictate how he chooses to improve the sentence.

Few grammatically correct paragraphs will be more dense and difficult to understand than the final example, which comes from a patent application, U.S. Pat. No. 5,678,053, Column 2, lines 51-62. The application is entitled "Grammar Checker Interface." Under "Field of Invention," the applicant briefly describes what he has created: "This invention relates to grammar checking systems and more particularly to a convenient interface for immediately indicating how to correct an improper sentence." To indicate missing words, the applicant proposes using a caret, or inverted V.

At the end of the Summary of the Invention lies the example:

It will be appreciated that by positioning the caret below the line of text, there is no occurrence in which the caret would be located through a character or piece of text on that line. While the caret is presently envisaged as providing an indication of the requirement for the insertion of a word between words in which there would be a space between the words, the caret can also be utilized to indicate misspellings in which a given character in the word is indicated as being in error or wrong. Thus the subject system can indicate not only missing words within a sentence but also can be utilized to indicate which letters in a word are wrong from a spelling point of view.

Microsoft Word® finds two problems with the paragraph: First, it highlights every word from the first "that" to the word "line" at the end of the first sentence. In the "Suggestions" box, the window reads, "Wordiness (no suggestions)." Second, it highlights the entire second sentence. In this "Suggestions" box, Word® offers, "Long sentence (no suggestions)." Word® finds nothing to improve in the third sentence. In the pop-up, "Readability Statistics," Word® gives the counts: one paragraph, three sentences, 124 words, 557 characters; offers the averages, three sentences per paragraph, 41.3 words per sentence, 4.4 characters per word. Under "readability," Word® finds that the "Flesch Reading Ease" score is 37.9, that the "Flesch-Kincaid Grade Level" is 12.0, and that two of the three sentences are passive.

The invention reveals to the applicant that all three sentences are passive; that the first contains two passive verbs, the second contains three passive verbs, and the third contains one passive verb. The invention also shows the applicant how to delete at least 80 of the 124 words, and, once the applicant has deleted those 80 words, how to reduce the number even further.

In Stage One, the invention marks the following words:

It will be appreciated that by positioning the caret below the line of text, there is no occurrence in which the caret would be located through a character or piece of text on that line{.} While the caret is presently envisaged as providing an indication of the requirement for the insertion of a word between words in which there would be a space between the words, the caret can also be utilized to indicate misspellings in which a given character in the word is indicated as being in error or wrong{.} Thus the subject system can indicate not only missing words within a sentence but also can be utilized to indicate which letters in a word are wrong from a spelling point of view{.}

The applicant examines each marked word and the words around it:

It will be appreciated that by positioning the caret below the line of text, there is no occurrence in which the caret would be located through a character or piece of text on that line{.} While the caret is presently envisaged as providing an indication of the requirement for the insertion of a word between words in which there would be a space between the words, the caret can also be utilized to indicate misspellings in which a given character in the word is indicated as being in error or wrong{.} Thus the subject system can indicate not only missing words within a sentence but also can be utilized to indicate which letters in a word are wrong from a spelling point of view{.}

_____ by positioning the caret below the line_____ _____, _____ the caret would (never) be located through a character _____ _____. While the caret is _____ _____ an indication of the requirement for the insertion of a word between words _____ _____ between the words, the caret can also be utilized to indicate misspellings _____ a given character _____ is _____. Thus the subject system can indicate not only missing words within a sentence but also can be utilized to indicate which letters _____ are wrong _____ _____.

In Stage Two, the invention marks these signs:

_____ by positioning the caret below the line _____ _____, _____ the caret would (never) be located through a character _____ _____. While the caret is _____ _____ an indication of the requirement for the insertion of a word between words _____ _____ between the words, the caret can also be utilized to indicate misspellings _____ a given character _____ is _____. Thus the subject system can indicate not only missing words within a sentence but also can be utilized to indicate which letters _____ are wrong _____ _____.

and the applicant examines each, looking for passive voice, nominalizations, and weak constructions.

_____ by positioning the caret below the line _____ _____, _____ the caret would (never) be located through a character _____ _____. While the caret is _____ _____ an indication of the requirement for the insertion of a word between words _____ _____ between the words, the caret can also be utilized to indicate misspellings _____ a given character _____ is _____. Thus the subject system can indicate not only missing words within a sentence but also can be utilized to indicate which letters _____ are wrong _____ _____.

_____ by positioning the caret below the line _____ _____, _____ the caret would never overlay _____ _____ a character _____ _____. While the caret _____ _____ indicates the requirement to insert _____ _____ a word between words _____ between the words, the caret can also _____ indicate misspellings _____ a given character _____ is _____. Thus the subject system can indicate not only missing words within a sentence but also can _____ indicate which letters _____ are wrong _____ _____.

The applicant now instructs the invention to look for all remaining prepositions under Stage Three:

_____ by positioning the caret below the line _____ _____, _____ the caret would never overlay _____ _____ a character _____ _____. While the caret _____ _____ indicates the requirement to insert _____ _____ a word between words _____ between the words, the caret can also _____ indicate misspellings _____ a given character _____ is _____. Thus the subject system can indicate not only missing words within a sentence but also can _____ indicate which letters _____ are wrong _____ _____.

The applicant examines the marked signs and deletes more words:

_____ by positioning the caret below the line _____ _____, _____ the caret would never overlay _____ _____ a character _____ _____. While the caret _____ _____ indicates the requirement to insert _____ _____ a word between words _____ between the words, the caret can also _____ indicate misspellings _____ a given character _____ is _____. Thus the subject system can indicate not only missing words within a sentence but also can _____ indicate which letters _____ are wrong _____ _____. _____ by positioning the caret below the line _____ _____, _____ the caret would never overlay _____ _____ a character _____ _____. While the caret _____ _____ indicates the requirement to insert _____ _____ a word _____ _____ _____ _____ _____, the caret can also _____ indicate misspellings _____ a given character _____ is _____. Thus the subject system can indicate not only missing words _____ but also can _____ indicate which letters _____ are wrong _____ _____.

Before entering Stage Four, the applicant would delete other words rendered unnecessary by the invention or change words that no longer fit.

_____ by positioning the caret below the line _____ _____, _____ the caret would never overlay _____ _____ a character _____ _____. While the caret _____ _____ indicates the requirement to insert _____ _____ a word _____ _____ _____ _____ _____, the caret can also _____ indicate misspellings _____ a given character _____ is _____. Thus the subject system can indicate not only missing words _____ but also can _____ indicate which letters _____ are wrong _____ _____.

_____ by positioning the caret below the line _____ _____, _____ it _____ would never overlay _____ a character _____ _____. While the caret _____ _____ indicates the need to insert _____ _____ a word _____ _____ _____ _____ _____, it _____ can also _____ indicate misspellings _____ _____ _____ _____.

Thus the subject system can indicate not only missing words _____ but also can _____ indicate which letters _____ are wrong _____ _____.

Finally resulting in:

By positioning the caret below the line, it would never overlay a character. While the caret indicates the need to insert a word, it can also indicate misspellings. Thus the subject system can indicate not only missing words but also can indicate which letters are wrong.

In Stage Four, the invention reveals what the applicant can see by reading what remains:

By positioning the caret below the line, it would never overlay a character. While the caret indicates the need to insert a word, it can also indicate misspellings.

Or

By positioning the caret below the line, it would never overlay a character. The subject system can indicate not only missing words but also can indicate which letters are wrong.

Or

By positioning the caret below the line, it would never overlay a character. While the caret indicates the need to insert a word, it can also indicate which letters are wrong.

Or

By positioning the caret below the line, it would never overlay a character. The subject system can indicate not only missing words but also misspellings.

The second and third sentences convey the same two thoughts. The applicant needs only one of the sentences, and either or a combination of the two will suffice. The applicant may now realize that the first sentence relates to neither of the latter two sentences. When the paragraph arrives at this level of clarity, the applicant may even wish to make the statement tighter by adding words.

Once a sentence is grammatical, problems with clarity, conciseness, and readability still arise from thousands of possibilities. A writer can spot a majority of these problems by searching among the universe of possibilities for a defined set of signs. The invention provides writers with these signs and how to use them. To aid the writers in searching for the signs, programmers can incorporate the invention in software. The invention even streamlines and simplifies the job of professional editors and publishers by providing them with specific clues to begin the process. Hundreds if not thousands of texts on writing already exist, and the software industry has produced several spelling and grammar/style checking programs, but nothing hones the editing process to a simple, concise, consistent method. Using the invention does not expose everything wrong with a sentence, but it directly exposes most of the problems and in that process often reveals others.

In a writing course or text based on the invention, a teacher can illustrate the method and show students how to use it to enhance their writing. Because the invention is precise and focuses on specific words, programmers can turn the invention into software for computer use.

A writer may use this method either manually or with a computer. A preferred method of manually using the system is with an editing card, which narrows the writer's attention to a single line. The writer slides the card down a page of written work one line at a time, focusing the writer's attention, preventing the writer's eye from wandering aimlessly over paragraphs of text. To guide the writer's eye toward potential problems, the key signs and selected words appear on the obverse side of the card. To instruct the writer on the meaning of the signs, an explanation of each appears on the reverse side of the card.

Figure 28:
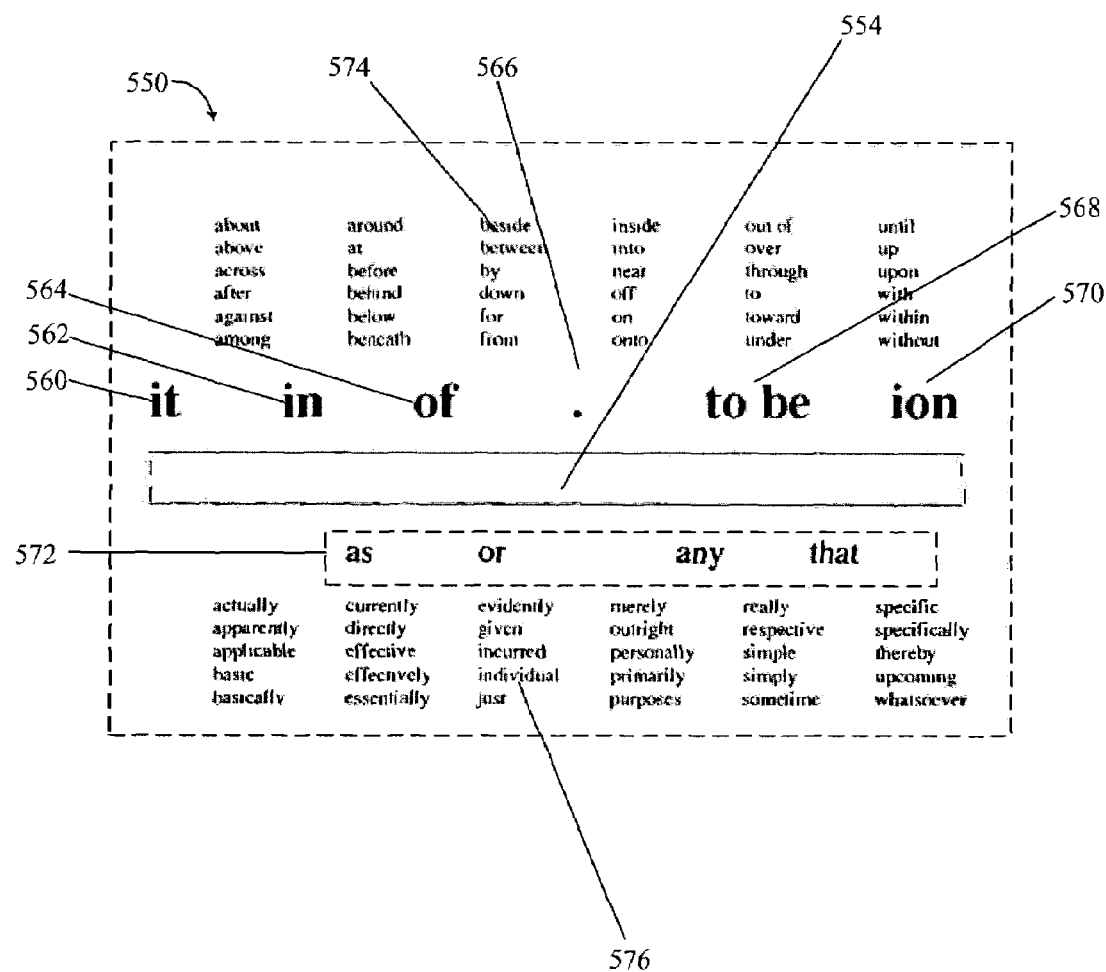
Figure 29:
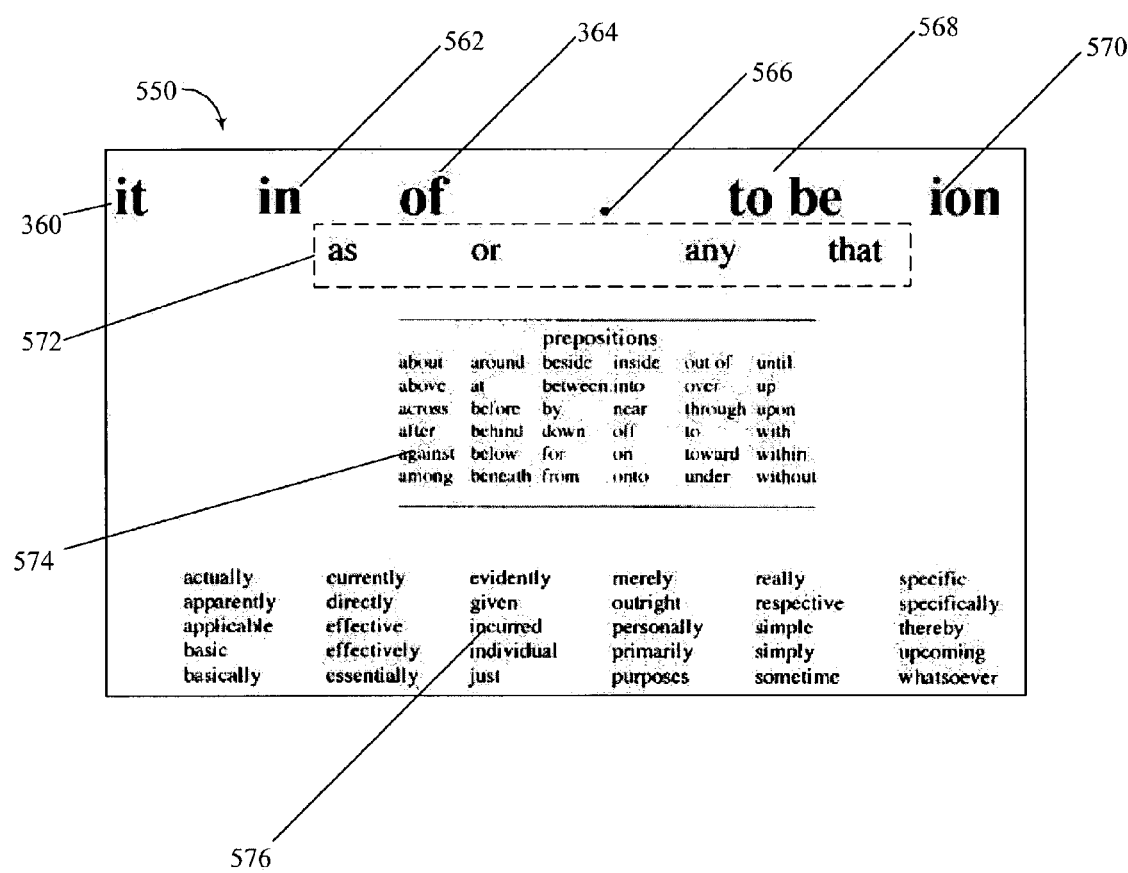

Referring now to FIGS. 28 and 29, the obverse of each of two preferred embodiments of the card 550 are portrayed. The principle difference between the two preferred embodiments shown is presence of an aperture 554 in the first embodiment shown in FIG. 28. The aperture 554 defines the scrutinized sentence. The dimensions of the aperture are selected appropriately to display a sentence in a given font size and style and further to limit the length of the display to a generally readable sentence. While there is nothing grammatically wrong with long sentences, the selection of a suitable dimension would tend to limit the use of an unduly long sentence where several distinct sentences might carry the meaning in a more lively and readable rhythm. The aperture will not preclude use on longer sentences as an author might use an edge of the card 550 to direct the attention of the author to the sentence under scrutiny as in the second embodiment shown in FIG. 29.

Referring to FIGS. 28 and 29, the presence of "it" 560 serves to remind the author of the method 10 FIG. 1 for removing useless words at the beginning of the sentence. Similarly, the presence of "in" 562 reminds the author of the method 150 for spotting many unnecessary phrases as shown in FIG. 7. The method 165, shown in FIG. 8, for removing unnecessary words in proximity to "of" is suggested by "of" 564. The period "." 566 suggests the method 250 shown in FIG. 13 for removing over explaining. The words "to be" suggest the method 300 for finding the passive voice set forth in FIG. 18.

Nominalizations generally end in "-ion." The presence of "ion" 570 recalls the method 352 for spotting and removing nominalizations shown in FIG. 22. The group 572 comprising "as," "or," "any," and "that" recall methods of removing useless words shown in FIGS. 10, 11, 27, and 12 respectively. The group of prepositions 574 invokes the method 250 illustrated in FIG. 13. Finally, the group of "junk" words 576 is words that should almost always be removed from active, vivid writing.

To provide instruction on the use of the card, the reverse 551 shown in FIG. 30 sets forth the meaning of the various signs on the obverse 550. Additionally, the reverse 551 sets forth an abbreviated set of instructions for use of the card.

To aid the writers in searching for the signs, programmers can incorporate the invention in software. The invention even streamlines and simplifies the job of professional editors and publishers by providing them with specific clues to begin the process. Hundreds if not thousands of texts on writing already exist, and the software industry has produced several spelling and grammar/style checking programs, but nothing hones the editing process to a simple, concise, consistent method. Using the invention does not expose everything wrong with a sentence, but it directly exposes most of the problems and in that process often reveals other problems.

In a writing course or text based on the invention, a teacher can illustrate the method and show students how to use it to enhance their writing. Because the invention is precise and focuses on specific words, programmers can turn the invention into software for computer use.

Figure 31:
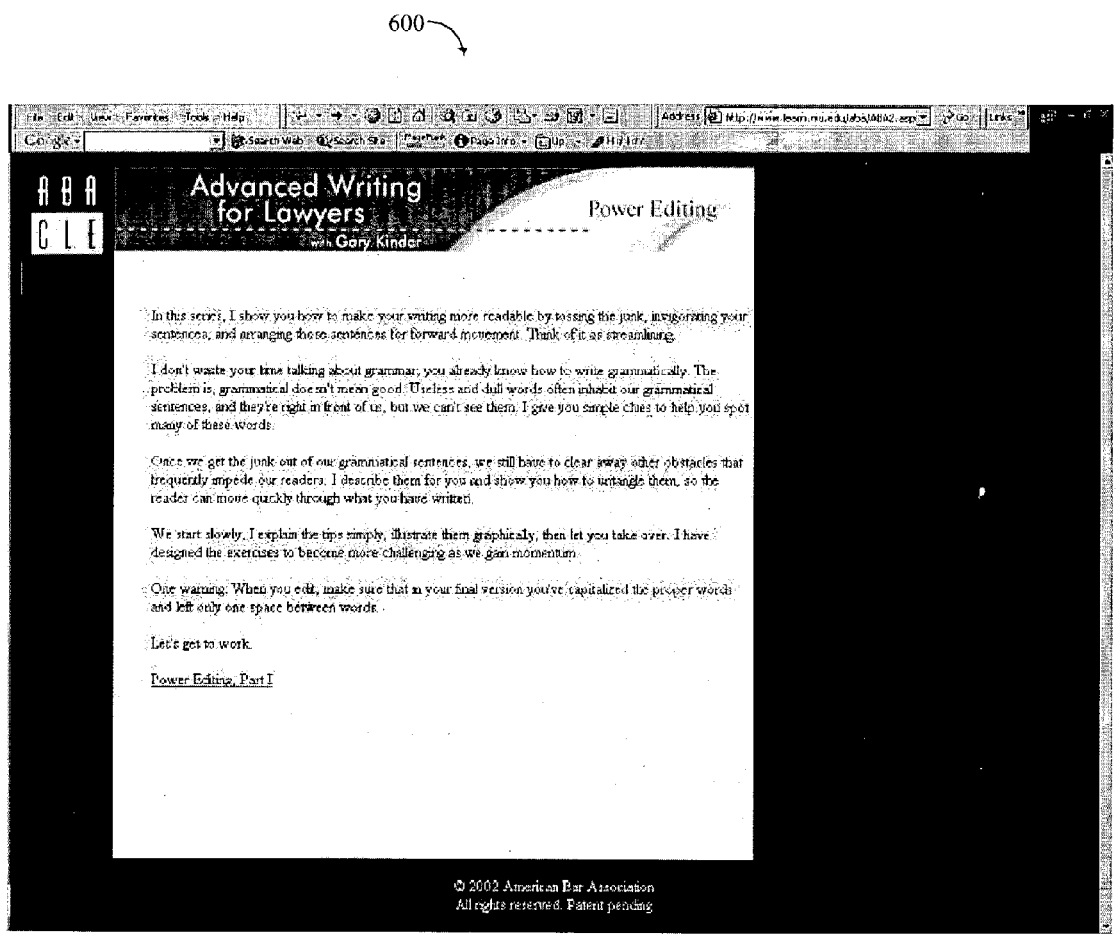
FIG. 31 illustrates a splash screen of a computer-based embodiment of the invention.
Figure 32:
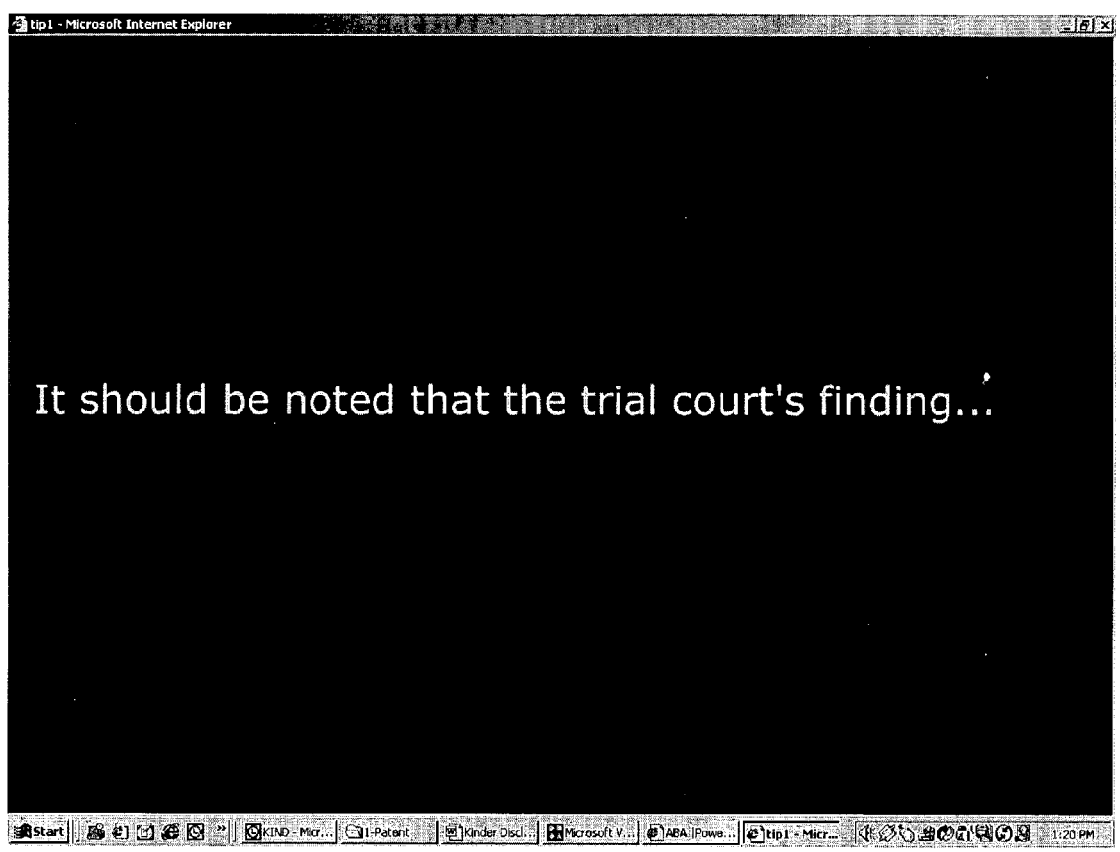

A computer-based embodiment of the invention is possible using the methods set forth in the preceding figures, FIGS. 1-30. Referring to FIG. 31, a splash screen 600 explains an overview of the preferred computer based embodiment of the method. Referring, to FIG. 32, in the screenshot 605, the first clause of a sentence is under scrutiny, "It should be noted that the trial court's finding . . ." The methods of the invention will seek to improve this sentence.

Figure 33:
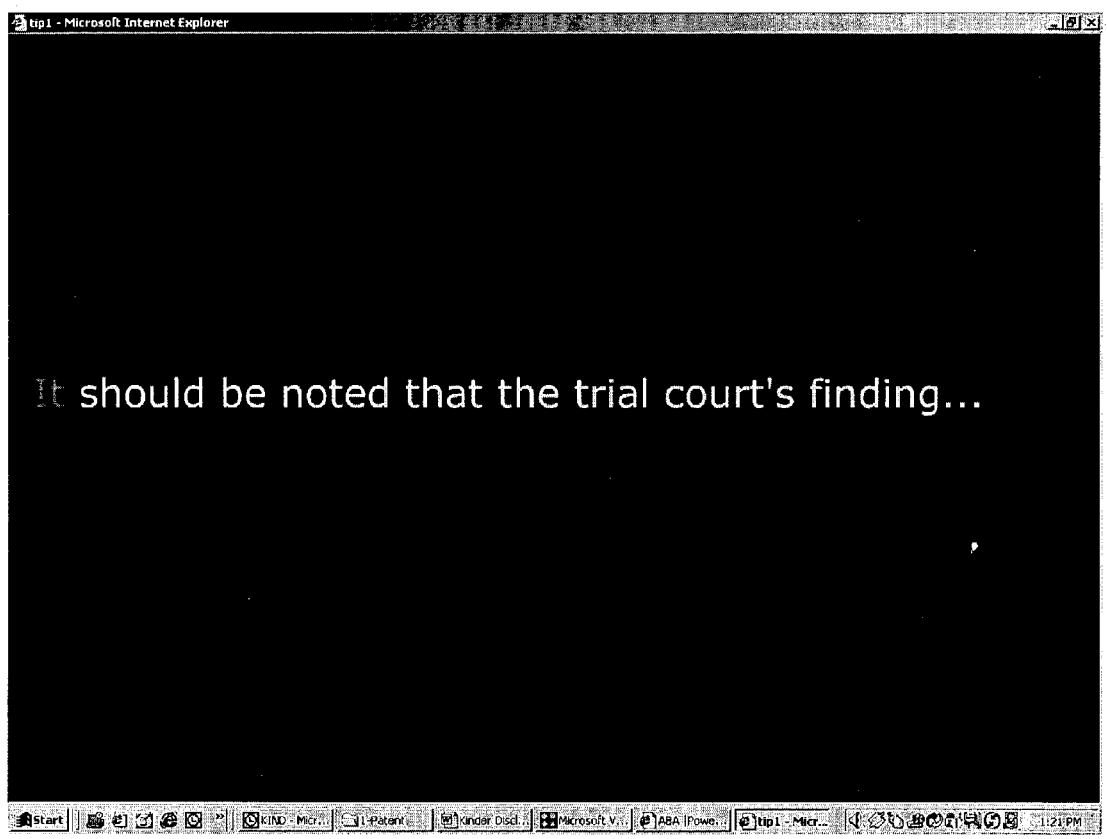
Figure 34:
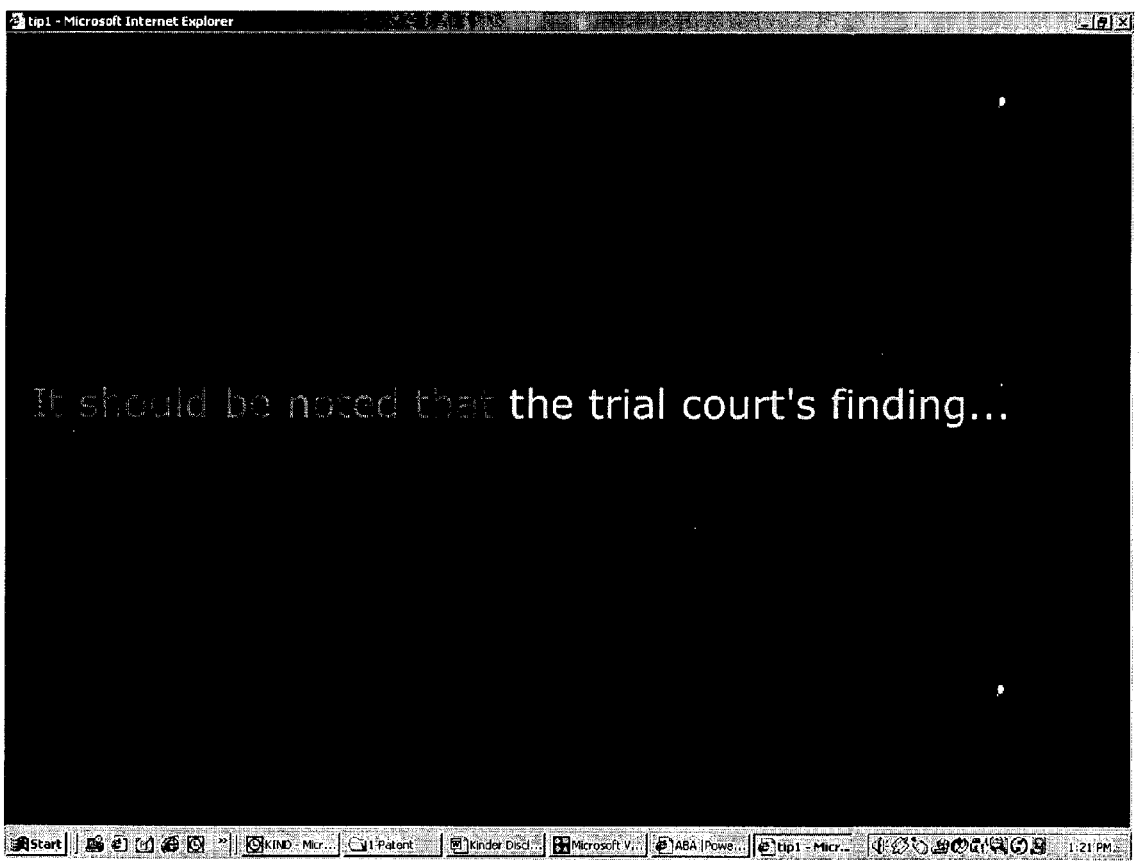
Figure 35:
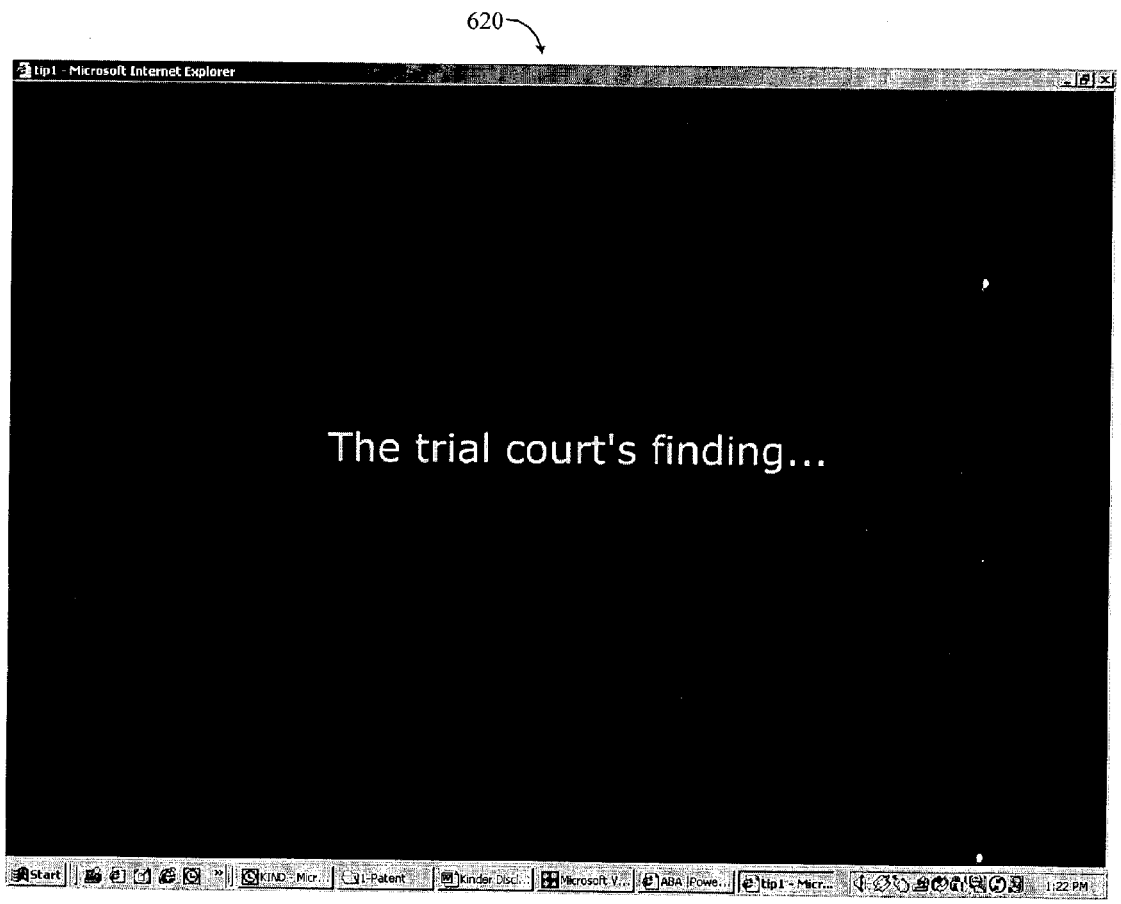

In FIG. 33, the screenshot 610 portrays the presence of "it" to invoke the method 100 FIG. 3, specifically the scanning at the block 105, shown in FIG. 3. FIG. 34 portrays the further identification of the presence of that in a second screenshot 615, as the method 100 sets forth at the block 107. After the method 100 decides that no core words exist as required at the block 111, the method 100 then removes the words between "it" and "then" resulting in the screenshot 620 shown in FIG. 35. The clause, as improved, now reads, "The trials court's finding . . ." The method 100 will move to the next rule at the block 123. Further rules might determine that removing the nominalization "finding" might be appropriate, in light of the unrevealed portion of the sentence.

While the preferred embodiment of the invention has been illustrated and described, as noted above, many changes can be made without departing from the spirit and scope of the invention. For example, for example, the method might be used for teaching rather than for editing. Accordingly, the scope of the invention is not limited by the disclosure of the preferred embodiment. Instead, the invention should be determined entirely by reference to the claims that follow.

What is claimed is:

1. A computer-implemented method of improving the human readability of a sentence, the method comprising:

scanning the sentence for each of a plurality of signs, each sign signifying a possible occurrence of unnecessary text in the sentence or text that can be improved, said sentence being grammatically correct;

detecting, as a result of said scanning, an occurrence in the sentence of a first sign of said plurality of signs; and in response to detecting the occurrence of the first sign, applying sign-dependent logic to the sentence to assess whether the sentence includes unnecessary text that can be removed, or text that can be improved, to enhance the human readability of the sentence, said sign-dependent logic including a check for typically unnecessary phrases containing the first sign, wherein different sign-dependent logic is used for different ones of said signs;

wherein the method is performed by computer.

2. The method of claim 1, wherein the plurality of signs includes the following words: "it," "there," "in," "of," "as," "or," and "that."

3. The method of claim 1, wherein the sign is a period, and the step of applying the sign-dependent logic comprises programmatically analyzing a group of words immediately preceding a period at the end of the sentence to assess whether the sentence includes an unnecessary prepositional phrase.

4. The method of claim 1, further comprising, in response to determining that the sentence includes unnecessary text, interacting with a user to determine whether the unnecessary text should be removed.

5. The method of claim 1, further comprising, in response to determining that the sentence includes unnecessary text, visually marking the unnecessary text in a computer display of the sentence.

6. The method of claim 5, wherein visually marking the unnecessary text comprises dimming the unnecessary text in the computer display.

7. The method of claim 5, wherein visually marking the unnecessary text comprises diminishing an intensity of the unnecessary text to reveal how a corresponding sentence reads without the unnecessary text.

8. The method of claim 1, further comprising displaying, in association with the occurrence of the first sign, explanatory text that reveals a meaning of the first sign.

9. The method of claim 1, wherein the first sign is the word "it."

10. The method of claim 9, wherein applying the sign-dependent logic comprises determining whether the occurrence of "it" appears as a pronoun, and when the occurrence of "it" is not used as a pronoun, checking the sentence for a plurality of unnecessary phrases containing the word "it."

11. The method of claim 9, wherein applying the sign-dependent logic for "it" comprises searching for an occurrence of "that" in a group of words following the occurrence of "it."

12. The method of claim 11, wherein applying the sign-dependent logic further comprises, in response to detecting an occurrence of "that" in said group of words, deleting from the sentence a phrase that starts with "it," ends with "that," and includes one or more words in between.

13. The method of claim 1, wherein the first sign is the word "there."

14. The method of claim 13, wherein applying the sign-dependent logic for "there" comprises searching the sentence for an occurrence of "that" after the occurrence of "there."

15. The method of claim 1, wherein the first sign is the word "in."

16. The method of claim 15, wherein applying the sign-dependent logic for "in" comprises determining whether the occurrence of "in" is part of a predetermined phrase that can be removed, and when the occurrence is not part of a predetermined phrase that can be removed, interacting with a user to determine whether a prepositional phrase beginning with "in" can be removed.

17. The method of claim 1, wherein the first sign is the word "of."

18. The method of claim 17, wherein applying the sign-dependent logic for "of" comprises determining whether the sentence includes a nominalization that can be converted to a verb.

19. The method of claim 1, wherein the first sign is the word "as."

20. The method of claim 1, wherein the first sign is the word "or."

21. The method of claim 1, wherein the first sign is the word "that."

22. A computer program that embodies the method of claim 1, said computer program stored on a computer-readable medium.

23. The method of claim 1, wherein the method comprises applying the sign-dependent logic associated with each sign only if the respective sign is present in the sentence, such that unnecessary processing is avoided.

24. The method of claim 1, wherein applying the sign-dependent logic comprises moving text within the sentence to improve the human readability of the sentence.

25. A computer-implemented method of assessing the readability of a sentence, comprising:
    scanning the sentence for each of a plurality of "to be" verbs;
    detecting, as a result of said scanning, an occurrence of a "to be" verb in the sentence; and
    assessing whether the occurrence of the "to be" verb signifies the presence of passive voice;
    wherein assessing whether the occurrence of the "to be" verb signifies the presence of passive voice comprises checking each of two words immediately following the occurrence of the "to be" verb to determine whether either of said two words is a strong verb;
    and wherein the method is performed by computer.

26. The computer-implemented method of claim 25, wherein the plurality of "to be" verbs consists of the following: am, is, was, were, are, been, be.

27. The computer-implemented method of claim 25, wherein the occurrence of the "to be" verb is an occurrence of one of the following: am, is, was, were, are, been, be.

28. The computer-implemented method of claim 25, further comprising the computer-implemented steps of:
    determining that one of said two words is a strong verb; and
    determining whether an object of the strong verb is included in the sentence prior to the strong verb.

29. The computer-implemented method of claim 28, further comprising programmatically generating a revised version of the sentence with passive voice eliminated.

30. The computer-implemented method of claim 25, further comprising, in response to determining that neither of the two words immediately following the occurrence of the "to be" verb is a strong verb, determining whether the occurrence of the "to be" verb signifies a presence of a nominalization that can be eliminated to improve the readability of the sentence.

31. The computer-implemented method of claim 30, further comprising, in response to determining that the occurrence of the "to be" verb signifies the presence of a nominalization, automatically revising the sentence to convert the nominalization to a verb.

32. A computer program that embodies the method of claim 25 stored on a computer-readable medium.

33. The method of claim 25, further comprising, when the occurrence of the "to be" verb is determined to signify the presence of passive voice, interacting with a user to determine whether the passive voice should be converted to active voice.

34. A computer-implemented method of assessing the readability of a sentence, comprising, via execution of a computer program:
    scanning the sentence for one of a plurality of prepositions, said sentence being grammatically correct;
    detecting, as a result of said scanning, an occurrence of a preposition;
    determining whether the occurrence of the preposition immediately follows a verb;
    if the occurrence of the preposition does not immediately follow a verb, interacting with a user of the computer program to determine whether the occurrence of the preposition is part of a prepositional phrase that can be removed from the sentence to improve human readability.

35. The computer-implemented method of claim 34, wherein interacting with the user comprises changing an appearance of a sequence of words beginning with the preposition to reveal to the user how the sentence reads without the sequence of words.

36. The computer-implemented method of claim 34, wherein scanning the sentence for one of a plurality of prepositions comprises excluding the prepositions "in" and "of."

37. A computer program that embodies the method of claim 34 stored on a computer-readable medium.

38. A computerized method of assessing the readability of a sentence, comprising:
   scanning the sentence to identify a sequence of four or more words that are separated by two commas;
   altering an appearance of the sequence of four or more words in a computerized display of the sentence; and
   determining whether the sequence of four or more words should be removed from the sentence to improve the sentence's readability.

39. The computerized method of claim 38, wherein altering the appearance comprises dimming the sequence of words.

40. The computerized method of claim 38, wherein determining whether the sequence of words should be removed comprises assessing whether the sentence will lose its meaning if the sequence of words is removed.

41. The computerized method of claim 38, wherein determining whether the sequence of words should be removed comprises programmatically interacting with a user.

42. The computerized method of claim 38, further comprising, in response to determining that the sequence of words should not be removed, moving the sequence of words to the beginning of the sentence.

43. A computerized method of assessing the readability of a sentence, comprising:
   scanning the sentence to detect an occurrence of the word "any";
   determining whether the occurrence of the word "any" immediately follows a negated verb;
   in response to detecting that the occurrence of "any" follows a negated verb, revising the sentence by making the negated verb positive, negating an object of the verb, and deleting the occurrence of "any".

44. A computerized method of improving the human readability of a sentence, the method comprising:
   detecting an occurrence of a potentially unnecessary word or phrase in a sentence; and
   dimming the occurrence of the potentially unnecessary word or phrase in a computerized display of the sentence to reveal to a user how the sentence reads without the potentially unnecessary word or phrase.

45. The method of claim 44, wherein detecting the occurrence of the potentially unnecessary word or phrase comprises detecting an occurrence of a sign in the sentence, and in response to detecting the occurrence of the sign, applying sign-specific decision logic to the sentence to check for potentially unnecessary language.

46. The method of claim 45, wherein the sign is one of the following words: "it," "there," "in," "of," "as," "or," "that," or a period.

47. The method of claim 44, wherein the sentence is grammatically correct, and the method further comprises interacting with the user to determine whether the potentially unnecessary word or phrase should be removed.

* * * * *